(12) United States Patent
Gao et al.

(10) Patent No.: US 12,003,971 B2
(45) Date of Patent: Jun. 4, 2024

(54) METHOD FOR SHARING SPECTRUM RESOURCES, APPARATUS, ELECTRONIC DEVICE AND STORAGE MEDIUM

(71) Applicant: Samsung Electronics Co., Ltd., Suwon-si (KR)

(72) Inventors: Wei Gao, Beijing (CN); Shoufeng Wang, Beijing (CN); Junyi Yu, Beijing (CN); Xiaohui Yang, Beijing (CN); Nan Cao, Beijing (CN); Wenjing Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 17/491,298

(22) Filed: Sep. 30, 2021

(65) Prior Publication Data

US 2022/0104027 A1 Mar. 31, 2022

(30) Foreign Application Priority Data

Sep. 30, 2020 (CN) .......................... 202011073981.4

(51) Int. Cl.
*H04W 16/04* (2009.01)
*H04W 16/14* (2009.01)
*H04W 28/16* (2009.01)

(52) U.S. Cl.
CPC ........... *H04W 16/04* (2013.01); *H04W 16/14* (2013.01); *H04W 28/16* (2013.01)

(58) Field of Classification Search
None
See application file for complete search history.

(56) References Cited

U.S. PATENT DOCUMENTS

| | | | | |
|---|---|---|---|---|
| 2010/0202305 A1* | 8/2010 | Wijting | ................. | H04W 16/14 370/252 |
| 2011/0275322 A1* | 11/2011 | Sawai | ................. | H04W 72/542 455/41.2 |

(Continued)

FOREIGN PATENT DOCUMENTS

| | | | | |
|---|---|---|---|---|
| EP | 1494490 A1 * | 1/2005 | ............ | H04W 16/14 |
| EP | 3657837 A1 | 5/2020 | | |
| WO | 2012163220 A1 | 12/2012 | | |

OTHER PUBLICATIONS

International Search Report and Written Opinion of the International Searching Authority in connection with International Application No. PCT/KR2021/013260 dated Dec. 27, 2021, 7 pages.

(Continued)

*Primary Examiner* — Jamaal Henson

(57) ABSTRACT

The present application provides a method for sharing spectrum resource, device, electronic device and storage medium, which belong to the technical field of wireless communication and artificial intelligence. The method includes predicting traffic data amount of the at least two radio access technology (RAT) systems in a set first sharing period according to history traffic data of the at least two RAT systems and allocating spectrum resources in the first sharing period to the at least two RAT systems respectively according to the predicted traffic data amount. Based on the solutions provided by embodiments according to the present application, the utilization rate of spectrum resources can be effectively increased, and the user's traffic perception can be improved.

19 Claims, 22 Drawing Sheets

(56) References Cited

U.S. PATENT DOCUMENTS

| | | | | |
|---|---|---|---|---|
| 2012/0120887 A1* | 5/2012 | Deaton | ............... | H04W 16/14 370/329 |
| 2013/0301609 A1* | 11/2013 | Smith | ............... | H04W 16/14 370/329 |
| 2014/0128073 A1* | 5/2014 | Farhadi | ............... | H04W 16/14 455/436 |
| 2014/0315560 A1* | 10/2014 | Smith | ............... | H04W 16/14 455/450 |
| 2016/0242117 A1* | 8/2016 | Lin | ............... | H04W 52/0219 |
| 2017/0034706 A1* | 2/2017 | Ericson | ............... | H04W 16/04 |
| 2017/0079045 A1 | 3/2017 | Meredith et al. | | |
| 2019/0357264 A1 | 11/2019 | Yi et al. | | |

OTHER PUBLICATIONS

Supplementary European Search Report dated Dec. 21, 2023, in connection with European Patent Application No. 21876002.3, 7 pages.

* cited by examiner

FIG. 8

[ orthogonal matrix ]*  •  history data matrix  =  Time-varying matrix
[ (N+M) × (N+M) ]           [ (N+M) × T ]            [ (N+M) × T ]

801 — orthogonal matrix
803 — history data matrix
805 — Time-varying matrix

METHOD FOR SHARING SPECTRUM RESOURCES, APPARATUS, ELECTRONIC DEVICE AND STORAGE MEDIUM

CROSS-REFERENCE TO RELATED APPLICATION

This application is based on and claims priority under 35 U.S.C. § 119 to Chinese Patent Application No. 202011073981.4 filed on Sep. 30, 2020 in the China National Intellectual Property Administration, the disclosure of which is incorporated by reference herein in its entirety.

BACKGROUND

1. Field

The application relates to the field of wireless communication and artificial intelligence technologies. Specifically, the present application relates to a method for sharing spectrum resources, an apparatus, an electronic device, and a storage medium.

2. Description of Related Art

In order to make up for the lack of 5G spectrum by 5G (5th-Generation, fifth-generation mobile communication technology) operators and quickly achieve nationwide 5G coverage, spectrum resource sharing technologies have emerged. By allowing 4G base stations to share part of the spectrum resources (in the time or frequency domains) with 5G base stations, and allowing 5G base stations sharing 4G base stations' radio frequency units, 5G base stations can obtain more spectrum resources and achieve faster national coverage.

In the current spectrum resource sharing solution, which carriers 4G base stations and 5G base stations share, resource allocations are determined by the current 4G traffic amount and the current 5G traffic amount, and the spectrum resources shared within a carrier switching period (usually a few seconds) is fixed, and the traffic amount of 4G and 5G base stations changes in seconds or even milliseconds. Therefore, the spectrum resources that can be shared by the existing technical solutions do not match the real-time changing 4G/5G traffic amount, resulting in a waste of spectrum resources. The spectrum resources acquired by the other part of the traffic are insufficient and need to wait a long time to obtain more spectrum resources, which will increase the delay of the traffic and reduce the rate of traffic. Therefore, the existing spectrum resource sharing solution needs to be improved so that resources are allocated in a way that better matches instant traffic demands.

SUMMARY

To improve allocation of spectrum resources, the present application provides a method for sharing spectrum resources, apparatus, electronic device, and storage medium. The solutions provided in the embodiments of the present application are specifically as follows:

On one aspect, the present application provides a method for sharing spectrum resources. The method includes predicting traffic data amount of at least two radio access technology (RAT) systems in a set first sharing period according to history traffic data of the at least two RAT systems, and allocating spectrum resources in the first sharing period to the at least two RAT systems respectively according to the predicted traffic data amount.

In another aspect, the present application provides an apparatus for sharing spectrum resources, which includes a data amount prediction module, configured to predict traffic data amount of at least two radio access technology (RAT) systems in a set first sharing period according to the history traffic data of the at least two RAT systems, and a resource allocation module, configured to allocate spectrum resources in the first sharing period to the at least two RAT systems according to the predicted traffic data amount.

In a further aspect, the present application provides an electronic device, which includes a memory and a processor, wherein computer programs are stored in the memory, and the computer programs, when executed by the processor, is configured to implement methods provided in embodiments of the present application.

According to some embodiments, the present application provides a computer-readable storage medium in which computer programs are stored, wherein the computer programs, when executed by a processor, is configured to implement methods provided in embodiments of the present application.

The beneficial effects brought about by the technical solutions provided by the embodiments of the present application will be described in detail in the description of the specific implementation section below in conjunction with various optional embodiments, and the description will not be repeated here.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates aspects of an example method of obtaining a time-varying traffic data feature matrix based on a history traffic data feature matrix provided according to various embodiments of the present application;

DETAILED DESCRIPTION

Figure 1:
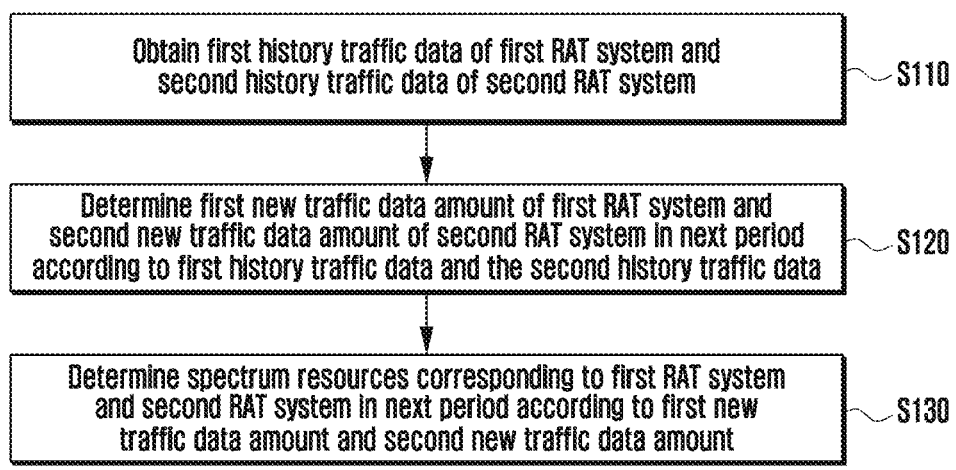
FIG. 1 illustrates operations of an example method for sharing spectrum resources provided certain embodiments of the present application.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments of the present disclosure are described in detail below, and the examples of the embodiments are illustrated in the drawings, where throughout the drawings, the same or similar reference numbers are used to depict the same or similar elements or elements having the same or similar functions. The embodiments described below with reference to the accompanying drawings are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "including" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

In order to better explain and understand the solutions provided in the embodiments of the present application, the following first describes the technologies related to the embodiments of the present application.

Spectrum resource sharing is the sharing of spectrum resources between different RAT systems. The spectrum sharing technology has dynamic spectrum configuration and management functions across different networks or systems, which can achieve high-efficiency, dynamic and flexible spectrum use to improve air interface efficiency, system coverage level and density, etc., so as to improve the comprehensive utilization efficiency of spectrum.

At present, the minimum shared spectrum resource between a 4G base station and a 5G base station is a carrier. Which carriers are shared is determined by the current 4G traffic amount and the current 5G traffic amount, and the shared spectrum resource is fixed during a carrier switching period. However, the base station's traffic amount changes in seconds or even milliseconds, and the traffic amount of different types of traffics are also very different. The determination of the shared spectrum resources according to the current traffic amount will cause the shared spectrum resources cannot match with the real-time changing traffic amount, and accordingly some traffic will waste resources, while some traffics get insufficient resources, which increases traffic latency and reduces traffic efficiency.

In order to solve address the above-described discrepancy between the traffic as currently measured and the changes in type and volume of traffic, the method for sharing spectrum resources provided by the embodiments of the present application predicts the traffic amount in the next period based on the history traffic data, so that the dynamic allocation of spectrum resources can be realized based on the predicted traffic amount, so that the traffic amount and the allocated resources can be better matched, thereby increasing resource utilization and avoiding resource waste.

Certain embodiments according to the present application predict a traffic distribution (distribution of traffic in the time dimension) through history traffic (also called traffic data amount) classification, principal component analysis and artificial intelligence, and share the spectrum resources of the 4G network with the 5G network. In this way, certain embodiments allocate spectral resources to time-varying traffic well, save frequency resources, and improve system performance.

The technical solution of the present application and how the technical solution of the present application solves the above technical problems will be described in detail below with specific embodiments. The following specific embodiments can be combined with each other, and the same or similar concepts or processes may not be repeated in some embodiments. The embodiments of the present application will be described below in conjunction with the drawings.

FIG. 1 illustrates operations of an example method for sharing spectrum resources provided by an embodiment of the present application. As shown in the non-limiting example of FIG. 1, the method may include the following steps:

Step S110 comprises obtaining first history traffic data of a first RAT system and second history traffic data of a second RAT system.

In this example, the first RAT system and the second RAT system are different wireless communication systems. In some embodiments, the first RAT system may be a 4G communication system (hereinafter referred to as 4G/4G system/4G base station), and the second RAT system may be a 5G communication system (hereinafter referred to as 5G/5G system/5G base station).

For any of the first history traffic data and the second history traffic data, the history traffic data includes the data amount to be transmitted in at least one history period. In certain embodiments according to this application, a duration of a period is not limited, and may be configured according to system needs. A period may include at least one-time unit, for example, a period may be a frame length (such as 10 milliseconds), and the granularity of a time unit is not limited in the embodiment of the present application either. For example, it may be a TTI (Transport Time Interval), a slot, a subframe, etc. For different RAT systems, the name or duration of the time unit may be different, for a 4G system, the duration of one TTI is equal to one slot.

At step S120, a first new traffic data amount of the first RAT system and a second new traffic data amount of the second RAT system in the next period according to the first history traffic data and the second history traffic data are determined.

Step S130 comprises determining the spectrum resources corresponding to the first RAT system and the second RAT system in the next period according to the first new traffic data amount and the second new traffic data amount, that is, allocating the spectrum resources in the next period for the two RAT systems according to the data amount of the first RAT system and the data amount of the second RAT system respectively.

Certain embodiments according to the present application predict the new traffic data amount in the next period according to the history traffic data of at least one period of the first RAT system and the second RAT system and allocate resources based on the predicted traffic amount. In some embodiments, the shared spectrum resources of the first RAT system and the second RAT system are determined according to the new traffic amount in the next period predicted based on history traffic data, instead of determining the shared spectrum resources based on the current traffic amount. As such, embodiments according to the present application allocate spectrum resources in a way that is more in line with the features of real-time changes in the traffic amount, and the determined shared spectrum resources can more closely match the real-time changing traffic amount, make the resource allocation more reasonable, better meet the actual traffic needs and improve the resource utilization.

The specific implementation of the determining the first new traffic data amount of the first RAT system and the second new traffic data amount of the second RAT system in the next period according to the first history traffic data and the second history traffic data according to this disclosure is not limited to a single embodiment. For example, it can be implemented by a pre-trained AI (Artificial Intelligence) model. In some embodiments, the input of the model can include the first history traffic data and the second history traffic data, and the output is the first new traffic data amount and the second new traffic data amount.

Certain embodiments according to this disclosure provide a method for sharing spectrum resources, which can be executed by any electronic device, for example, it can be executed by a base station of the first RAT system, such as a 4G base station, or can be executed by a base station of the first RAT system and the electronic device communicating with the base station of the second RAT system, the electronic device can obtain the above history traffic data, and predict the traffic amount of the two systems in the next period according to the history traffic data, and determine the shared spectrum resources between the two systems based on the predicted traffic amount.

In the following non-limiting example, a 4G base station acts as an execution platform for determining an allocation of spectrum resources according to embodiments of this disclosure. Accordingly, the 4G base station and the 5G base station can collect their respective history traffic data, and the 5G base station transmits the collected history traffic data to the 4G base station in a specified format (pre-arranged format). After the 4G base station receives the data transmitted by the 5G base station, the 4G base station reads it according to the specified format to obtain the history traffic data of the 5G base station, and executes the method provided by the embodiment of the present application according to the history traffic data of the 4G base station and the history traffic data of the 5G base station, determine the shared spectrum resources corresponding to the 4G base station and the 5G base station, and allocates the shared spectrum resource to the 5G base station for use.

In at least one embodiment of the present application, determining the first new traffic data amount of the first RAT system and the second new traffic data amount of the second RAT system in the next period according to the first history traffic data and the second history traffic data, includes determining time-invariant traffic data features and first time-varying traffic data features corresponding to the history traffic data according to the first history traffic data and the second history traffic data, predicting second time-varying traffic data features in the next period according to the first time-varying traffic data features, and determining the first new traffic data amount of the first RAT system and the second new traffic data amount of the second RAT system in the next prediction period according to the time-invariant traffic data features and the second time-varying traffic data features.

In practical applications, the time-varying traffic data of the user is caused by the time-varying constant affecting factor and the time-varying affecting factor. The constant affecting factor is related to the user's own attributes and is time-invariant. For example, the user equipment only supports 4G traffics, or supports both 4G and 5G traffics. The time-varying affecting factor is related to traffic features. The data under the time-varying affecting factor is a function of time t. For example, video traffic can have periodic features, while network browsing or instant messages have can present sudden spikes or impulses in traffic flow. Since it is can be difficult and to directly and accurately predict the time-varying user traffic data affected by multiple factors, certain embodiments according to the present application decompose a user's history traffic data into history data features (that is time-invariant traffic data features) affected by persistent, largely invariant factors and history data features (that is, first time-varying traffic data features) under time-varying affecting factors, and respectively predicts the data features (that is, the second time-varying traffic data feature) in the next period under multiple time-varying affecting factors, and then combines the data feature under the constant affecting factor and the predicted data feature under multiple time-varying affecting factors to obtain the predicted user traffic data in the next period.

According to some embodiments, second time-varying traffic data features in the next period according to the first time-varying traffic data feature are predicted, which can also be realized by using a pre-trained AI model. In this case, the input of the AI model may be first time-varying traffic data features, and the output thereof is second time-varying traffic data features.

Since the time-invariant traffic data features are relatively stable, in some embodiments, the traffic data is classified into two parts: time-varying traffic data and time-invariant traffic data, and the time-varying traffic data features in the next period is predicted based on the history time-varying traffic data features. This processing method takes the time-invariant traffic data features as constants. In the data prediction part, only the time-varying traffic data parts that change with time can be considered, and the data processing can be more refined, so as to improve the accuracy of prediction.

In various embodiments according to the present application, determining the time-invariant traffic data features and the first time-varying traffic data features corresponding to the history traffic data according to the first history traffic data and the second history traffic data may includes generating a history traffic data matrix according to the first history traffic data and the second history traffic data, and obtaining a time-invariant traffic data feature matrix and a first time-varying traffic data feature matrix corresponding to the history traffic data according to the history traffic data matrix. In some embodiments, an element value of the time-invariant traffic data feature matrix represents the feature of the to-be-transmitted data amount, which is independent of time, among the to-be-transmitted data amount of at least one history period of the first RAT system or the second RAT system. Further, in some embodiments, one element value of the time-varying traffic data feature matrix represents the features of the to-be-transmitted data amount, which is related to time, among the to-be-transmitted data amount of at least one history period of the first RAT system or the second RAT system.

In various embodiments according to this disclosure, predicting the second time-varying traffic data features in the next period according to the first time-varying traffic data feature includes predicting the second time-varying traffic data feature matrix in the next period according to the first time-varying traffic data feature matrix. In this non-limiting example, determining the first new traffic data amount of the first RAT system and the second new traffic data amount of the second RAT system in the next prediction period according to the time-invariant traffic data features and the second time-varying traffic data features, includes obtaining the first new traffic data amount and the second new traffic data amount according to the time-invariant traffic data feature matrix and the second time-varying traffic data feature matrix.

In certain embodiments, the time-varying traffic data features and the time-invariant traffic data features can be expressed by a matrix. The history traffic data matrix, that is, the first history traffic data and the second history traffic data are represented by a matrix, and an element value in the matrix is the data amount to be transmitted corresponding to each of the above at least one history period of the first RAT system or the second RAT system. In various embodiments, the element value of the time-invariant traffic data feature matrix represents the feature value of the time-invariant traffic data amount in the data amount to be transmitted, and the first time-varying traffic data matrix represents the feature value of the time-varying traffic data amount in the data amount to be transmitted.

It should be noted that for the data amount to be transmitted in the history traffic data, according to actual application requirements, the granularity of the data amount can be classified in different ways. For example, the data amount to be transmitted can be the data amount of each period in the above at least one history period, or may be the data amount of each time unit in each period, or may be the data amount of each traffic type of each time unit in each period, or may be the data amount of each traffic type of each user corresponding to each time unit in each period, that is, in the embodiment of the present application, the granularity of the data amount to be transmitted can be classified according to one or more of the period, time unit, traffic type, user and other information, correspondingly, the granularity of the predicted first new traffic data amount and the second new traffic data amount corresponds to the granularity of the data amount to be transmitted. In other words, the traffic data amount in the embodiment of the present application may be the data amount corresponding to each traffic data category, wherein the traffic data category may be classified according to at least one of the users, the traffic type, and the RAT system.

In various embodiments, for any history traffic data in the first history traffic data and the second history traffic data, the data amount to be transmitted may be the data amount to be transmitted of each traffic type of each user corresponding to each time unit of each period in at least one history period. At this time, an element value in the above history traffic data feature matrix represents a feature value of the data amount to be transmitted of one traffic type of one user corresponding to one-time unit of the first RAT system or the second RAT system. Correspondingly, the above element values in the time-invariant traffic data feature matrix, the first time-varying traffic data feature matrix, and the second time-varying traffic data feature matrix represent the feature value of the history time-invariant data amount, the feature value of the history time-varying data amount, and the feature value of the predicted time-varying data amount of the traffic data of one traffic type of one user corresponding to one time unit.

According to various embodiments, the history time-invariant traffic data feature matrix and the first time-varying traffic data feature matrix can be obtained based on the history traffic data matrix through a principal component analysis algorithm (i.e., the PCA (Principal Component Analysis)). The principal component analysis algorithm can reduce the dimension of the time-varying data matrix (history traffic data matrix) into a time-varying data array (i.e., the first time-varying traffic data feature matrix) and a time-invariant constant matrix (i.e., the first time-invariant traffic data feature matrix) under several main affecting factors, which helps reduce the complexity of subsequent predicted data and improve accuracy. Specifically, the input of the PCA algorithm is the history traffic data matrix, and the output is the orthogonal constant matrix and the time-varying matrix. The orthogonal constant matrix is the time-invariant traffic data feature matrix, and the time-varying matrix is the first time-varying traffic data feature matrix, the time-varying matrix represents the change features of the time-varying traffic data amount corresponding to various different time-varying traffic affecting factors. These time-varying affecting factors are related to traffic types and can show different traffic features.

After the first time-varying traffic data feature matrix is obtained through the PCA algorithm, the second time-varying traffic data feature matrix corresponding to the next period can be predicted based on the matrix, and then the time-invariant traffic data feature matrix and the second time-varying traffic data feature matrix are processed by the inverse principal component analysis algorithm to obtain the traffic data matrix in the next period, that is, the above first new traffic data amount and the second new traffic data amount are obtained. Similarly, the data amount granularity of the first new traffic data amount and the second new traffic data amount corresponds to the data amount granularity of the traffic data to be transmitted of the history traffic data.

In some embodiments of the present application, similarly, the prediction of the second time-varying traffic data feature matrix based on the first time-varying traffic data feature matrix can be realized by a pre-trained neural network model, that is, it can be predicted by an AI model, wherein the input of the model is the first time-varying traffic data feature matrix, and the output is the second time-varying traffic data feature matrix.

In some embodiments of the present application, for any one of the above at least one history period and the next period, one period may include at least one time unit, and the data amount to be transmitted in at least one history period includes the data amount to be transmitted corresponding to each time unit of the at least one history period, the first new traffic data amount and the second new data amount include the traffic data amount corresponding to each time unit in the next period; correspondingly, the determining the spectrum resources corresponding to the first RAT system and the second RAT system in the next period according to the first new traffic data amount and the second new traffic data amount, includes determining the spectrum resources corresponding to the first RAT system and the second RAT system corresponding to each time unit in the next period according to the first new traffic data amount and the second new traffic data amount.

In the above-described example, the data amount granularity of the traffic data may be the data amount corresponding to each time unit. Accordingly, the allocation granularity of the spectrum resources between the first RAT system and the second RAT system may also be the spectrum resources corresponding to each time unit, that is, allocating the spectrum resources of each time unit in the next period to the two systems respectively according to the corresponding data amount of the RAT systems in each time unit.

In at least one embodiment of the present application, any history traffic data further includes the actually transmitted data amount of at least one history period. For any one of the first RAT system and the second RAT system, the method further includes determining the history legacy data amount of the system according to the data amount to be transmitted and the actually transmitted data amount in the history traffic data of the system. In this example, determining the spectrum resources corresponding to the first RAT system and the second RAT system in the next period according to the first new traffic data amount and the second new traffic data amount respectively includes determining the first total data amount of the first RAT system in the next period according to the first new traffic data amount and the history legacy data amount of the first RAT system, determining the second total data amount of the second RAT system in the next period according to the second new traffic data amount and the history legacy data amount of the second RAT system, and determining the spectrum resources respectively allocated to the first RAT system and the second RAT system in the next period according to the first total data amount and the second total data amount.

In many real-world networks, the data amount to be transmitted and the data amount actually transmitted in each period (or each time unit) are usually not equal, in other words, there will be the data amount that has not been transmitted, that is, the history legacy data amount, and the legacy data amount needs to continue to be transmitted in later periods or time units. Therefore, after predicting the new traffic data amount in the next period, it is also necessary to determine the legacy data amount in the history period. The total data amount corresponding to the next period is obtained based on the new traffic data amount in the next period and the legacy data amount in the history period, and the spectrum resources of the first RAT system and the second RAT system are determined based on the total amount of the first RAT system and the total data amount of the second RAT system respectively.

Specifically, the first history legacy data amount of the first RAT system (that is, the difference between the total data amount to be transmitted and the total data amount actually transmitted in the history period) can be determined according to the data amount to be transmitted and the data amount actually transmitted in the first history traffic data, and, the first total data amount of the first RAT system is determined based on the first history legacy data amount and the first new traffic data amount. Similarly, the second history legacy data amount of the second RAT system is determined according to the data amount to be transmitted and the data amount actually transmitted in the second history traffic data, and the second total data amount of the second RAT system is determined based on the second history legacy data amount and the second new traffic data amount.

In some embodiments according to the present application, a period includes at least one time unit, the data amount to be transmitted in at least one history period includes the data amount to be transmitted corresponding to each time unit in at least one history period, the first new traffic data amount and the second new traffic data amount includes the new traffic data amount corresponding to each time unit in the next period. In certain embodiments determining, for any one of the first RAT system and the second RAT system, the total data amount of the system in the next period according to the new traffic data amount of the system and the history legacy data amount of the RAT system, includes, for any time unit in the next period, determining the total data amount of the time unit based on the new traffic data amount corresponding to the time unit and the legacy data amount of the previous time unit of the time unit, wherein the legacy data amount in the previous time unit of the first time unit in the next period is the history legacy data amount. In this example, determining the spectrum resources corresponding to the first RAT system and the second RAT system in the next period respectively according to the first total data amount and the second total data amount, includes, for any time unit in the next period, determining the spectrum resources of the first RAT system and the second RAT system corresponding to this time unit based on the first total data amount of the first RAT system and the second total data amount of the second RAT system corresponding to the time unit.

As can be seen from the above description, a period can include one or more time units, and correspondingly, the above traffic amounts (data amount to be transmitted, first new traffic data amount, second new traffic data amount, total data amount, etc.) can be refined into the traffic data amount corresponding to each time unit. At this time, when the total data amount of each time unit in the next period is determined based on the history legacy data amount (the data amount is the total data amount which haven't been transmitted in at least one history period in the history traffic data), the history legacy data amount and the new traffic data amount of the first time unit in the next period can be added to obtain the total data amount of the first time unit. For each time unit other than the first time unit, the new traffic data amount of the time unit and the legacy data amount of the previous time unit of the time unit (that is, the data amount which has not yet been transmitted, that is, the data amount difference between the total data amount and the actually transmitted data amount) are added to obtain the total data amount of the time unit.

Correspondingly, if the shared spectrum resources between the first RAT system and the second RAT system is determined based on the first total data amount and the second total data amount when the above total data amount is the data amount of each time unit in the next period, the spectrum resources corresponding to the two systems in each time unit can be determined based on the first total data amount of the first RAT system and the second total data amount of the second RAT system corresponding to each time unit, that is, the allocation granularity of spectrum resources can be refined into each time unit.

In some embodiments according to the present application, any of the above history traffic data includes the data amount to be transmitted corresponding to each traffic type of at least one history period, and the first new traffic data amount and the second traffic data amount include a new traffic data amount corresponding to each traffic type in the next period. Further, in some embodiments, determining the shared spectrum resources between the first RAT system and the second RAT system in the next period according to the first new traffic data amount and the second new traffic data amount, includes determining the spectrum resources corresponding to each traffic type of the first RAT system and each traffic type of the second RAT system in the next period according to the first new traffic data amount and the second new traffic data amount.

In this non-limiting example, the traffic data amount can also be classified according to traffic types, and correspondingly, the predicted first new traffic data amount and second new traffic data amount may be the new traffic amount corresponding to each traffic type. As such, in some embodiments, the allocation of shared spectrum resources can be refined into various traffic types so as to allocate corresponding spectrum resources for each traffic type according to the traffic amount of each traffic type, so as to better meet the traffic requirements of each traffic type and improve users' perception of traffic use.

In various embodiments according to the present application, any of the above history traffic data includes the data amount to be transmitted corresponding to each user in at least one history period, and the first new traffic data amount and the second new traffic data amount include the new traffic data amount corresponding to each user in the next period. In some embodiments, the determining the spectrum resources corresponding to the first RAT system and the second RAT system respectively in the next period according to the first new traffic data amount and the second new traffic data amount includes determining the spectrum resources corresponding to each user of the first RAT system and each user of the second RAT system in the next period according to the first new traffic data amount and the second new traffic data amount.

In this non-limiting example, the traffic data amount can also be classified according to users, that is, the traffic amount can be specific to the data amount corresponding to each user, and correspondingly, the predicted first new traffic data amount and second new traffic data amount can be the new traffic amount corresponding to each user. Through this solution, the corresponding spectrum resources can be allocated to the traffics for each user of the first RAT system and the second RAT system according to the corresponding traffic amount of each user, which can better meet the needs of each user under each system.

In certain embodiments according to the present application, determining the corresponding spectrum resources of the first RAT system and the second RAT system in the next period according to the first total data amount and the second total data amount includes determining each candidate spectrum resource allocation solution for the first RAT system and the second RAT system in the next period according to the first total data amount, the second total data amount, and the total spectrum resources in the next period, and determining the target allocation solution of the first RAT system and the second RAT system according to each candidate spectrum resource allocation solution.

Since the total spectrum resources are determined, after the total data amount of the first RAT system and the second RAT system corresponding to the next period (or each time unit in the next period) is determined, all the optional allocation solutions can be determined based on the total data amount and the total spectrum resources corresponding to each system, that is, the above each candidate spectrum resource allocation solutions, and the final allocation solution, that is, the target allocation solution, can be determined from the various optional resource allocation solutions.

Embodiments according to the present disclosure are not limited to a single method for determining the target allocation solution from each candidate spectrum resource allocation solution. For example, the selection condition can be set according to the actual needs, and the candidate resource allocation solution meets the condition can be selected as the target allocation solution. For example, the allocation solution can be selected according to the transmission delay requirements of the traffic or the transmission rate requirements, or any candidate spectrum resource allocation solution can be used as the target allocation solution.

In some embodiments according to the present application, determining the target allocation solution of the first RAT system and the second RAT system according to each candidate spectrum resource allocation solution includes selecting candidate solutions that meet a traffic data transmission constraint condition from the candidate spectrum resource allocation solutions according to the condition and determining the target allocation solution from the selected candidate solutions.

Wherein, the traffic data transmission constraint condition can be set according to actual needs, including but not limited to the above traffic data transmission delay requirements, transmission rate requirements, etc., for example, when the granularity of the traffic data amount is the data amount corresponding to each traffic type, the candidate spectrum resource allocation solution can be the allocation solution corresponding to each traffic type, and the above constraint condition can include the transmission requirements of each traffic type. Based on the constraint condition, the candidate solutions that do not meet the requirements can be filtered out, and then the target allocation solution is determined from the candidate solution that meet the requirements.

In various embodiments according to the present application, determining the target allocation solution of the first RAT system and the second RAT system according to each candidate spectrum resource allocation solution includes determining the target allocation solution based on the first total data amount, the second total data amount, the data amount carried by the spectrum resources corresponding to the first total data amount in each candidate spectrum resource allocation solution, and the data amount carried by the spectrum resources corresponding to the second total data amount.

For each candidate spectrum resource allocation solution, the solution includes the spectrum resources allocated for the first total data amount of the first RAT system and the spectrum resources allocated for the second total data amount of the second RAT system. In order to allocate resources optimally, that is, in order to select a relatively optimal allocation solution from the respective candidate spectrum resource allocation solutions, the relative optimal allocation solution can be selected from the respective candidate solutions based on the first total data amount of the first RAT system, the second total data amount of the second RAT system, and the data amount that can be carried by the spectrum resource allocated for the first RAT system based on the first total data amount (i.e., the above carried data amount) in the candidate spectrum resource allocation solution, and the data amount carried by the spectrum resources allocated for the second RAT system based on the second total data amount, and the target allocation solution is selected based on the data amount carried by the allocated spectrum resources and the total data amount determined by prediction, which can help ensure the efficacy of spectrum resource allocation, improve resource utilization, and avoid resource waste.

It can be understood that when the total data amount is fine-grained data amount, such as the data amount corresponding to each user, the data amount corresponding to each traffic type, and the data amount corresponding to each time unit, the candidate spectrum resource allocation solution is the allocation solution of the spectrum resource corresponding to the fine-grained data amount. Correspondingly, when selecting the target allocation solution according to the data bear amount of the spectrum resources and the total data amount, it can also be determined based on the fine-grained total data amount and the data bear amount of the spectrum resources corresponding to the fine-grained total data amount. For example, the first total data amount may be the total data amount of each traffic type of the system corresponding to each user in the first RAT system corresponding to each time unit, and the second total data amount may be the total data amount of each traffic type of the system corresponding to each user in the second RAT system corresponding to each time unit, and the candidate spectrum resource allocation solution is the allocation solution of the spectrum resources corresponding to each traffic type of each user in the first RAT system and the second RAT system of each time unit. When determining the target allocation solution, the target allocation solution is determined from the respective candidate solutions according to the total traffic amount of each traffic type of each user corresponding to each time unit in each system and the data amount carried by the spectrum resources allocated for the data amount in the candidate solution.

In certain embodiments, determining the target allocation solution according to the first total data amount, the second total data amount, the data amount carried by the spectrum resources corresponding to the first total data amount in each candidate spectrum resource allocation solution, and the data amount carried by the spectrum resources corresponding to the second total data amount, includes determining the allocation solution corresponding to the minimum difference in the traffic data amount among the candidate spectrum resource allocation solutions as the target allocation solution. In this non-limiting example, the difference in traffic data amount is the sum of the first difference and the second difference. For any candidate spectrum resource allocation solution, the first difference is the different between the first total data amount and the data amount carried by the spectrum resources corresponding to the first total data in the candidate spectrum resource allocation solution, and the second difference is the difference between the second total data amount and the data amount carried by the spectrum resource corresponding to the second total data amount in the candidate spectrum resource allocation solution.

In other words, the allocation solution with the minimum difference between the data amount carried by the spectrum resources allocated for each total data amount of the first RAT system and the second RAT system in each candidate spectrum resource allocation solution and the total data amount to be transmitted is used as the target allocation solution. Based on this solution, it is possible to avoid the ineffective or inefficient resource utilization caused by relatively excessive resource allocation for some data amounts and relatively insufficient resources for some data amounts, so that the user's traffic use perception can be improved as much as possible.

It should be noted that, in the solutions provided by certain embodiments of the present application, the allocation granularity (i.e., unit) of spectrum resources is not limited in the embodiments of the present application. For example, it may be a carrier or an RBG (Resource Block Group), an RB (Resource Block), etc. Optionally, the allocation granularity may be one RB, so as to optimize the resource allocation solution as much as possible and improve resource utilization.

Figure 2:
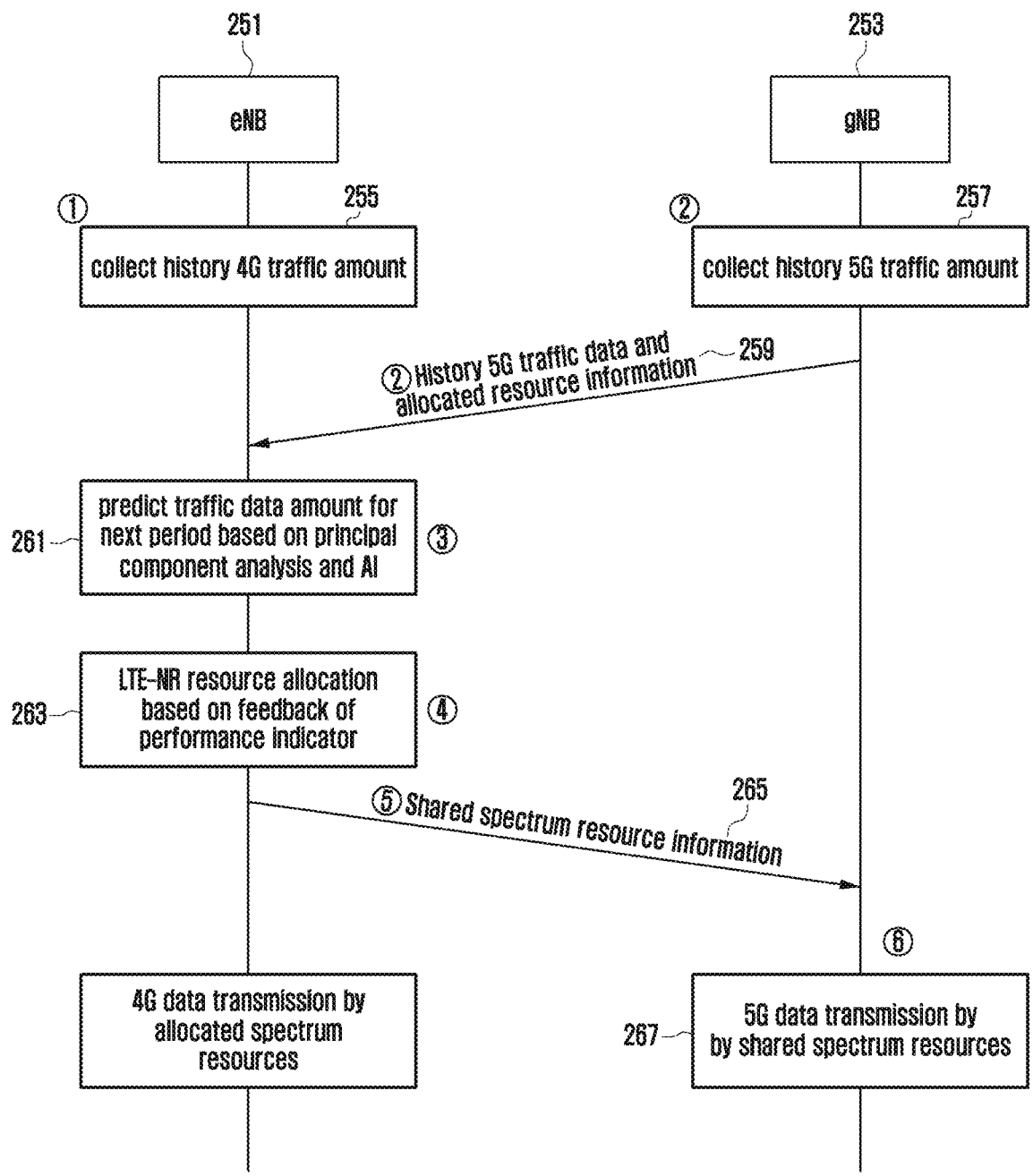
FIG. 2 illustrates operations of a method for sharing spectrum resources according to various embodiments of the present application.

FIG. 2 illustrates operations of a method for sharing spectrum resources according to various embodiments of the present application. In order to better describe the solutions and beneficial effects of embodiments of the present application, the principle of the solutions provided by the present application will be further described in detail with reference to the non-limiting example of FIG. 2.

In the following description of optional embodiments, the first RAT system, implemented through eNB 251 is a 4G communication system (hereinafter referred to as 4G), and the second RAT system, implemented through gNB 253 is a 5G communication system (hereinafter referred to as 5G), one period is one frame length, and one time unit is 1 slot and the allocation granularity of spectrum resources is 1 RB as an example. As used in this disclosure 4G system can also be referred to as an LTE (Long Term Evolution) system, and the 5G system can also be as an NR (New Radio) system. The illustrative example of FIG. 2 shows a schematic flowchart of the method for sharing spectrum resource provided by this embodiment. As shown in FIG. 2, the method may include the following steps:

Step 1: Corresponding to block 255 in the figure, eNB 251 collects history 4G traffic data (the first history traffic data, the history 4G traffic amount shown in the figure);

Step 2: Corresponding to step ② in the figure, gNB 253 collects history 5G traffic data (second history traffic data, the history 5G traffic amount shown in the figure) at block 257, and gNB 253 transmits the collected history 5G traffic data to eNB 251 (shown by arrow 259);

Optionally, as shown in step ② in the figure, gNB 253 can also transmit the allocated resource information (i.e., spectrum resources) corresponding to the history 5G traffic data to eNB 251, and eNB 251 can update and optimize the AI model according to the history 5G traffic data and its corresponding allocated resource information (the neural network model used for determining the target allocation solution below), that is, history traffic data and its corresponding actual resource allocation solution can be used for the training and iterative update of the AI model.

Step 3: Corresponding to block 261 in FIG. 2, eNB 251 predicts the LTE-NR traffic data amount (LTE traffic data amount is the first new traffic data amount, and the NR traffic data amount is the second new traffic data amount) of each slot in a period of time in the future (that is, the next period, in this embodiment, a frame length of 10 ms) based on the principal component analysis algorithm and AI model;

Step 4: Corresponding to block 263 in the figure, on each slot, based on the predicted LTE-NR traffic data amount, by using the AI model, the feasible LTE-NR resource allocation solution is determined by eNB 251, and the optimal LTE-NR resource allocation solution (that is the target allocation solution) is determined by eNB 251 using the AI model in combination with the feedback of the performance indicator;

Step 5: Corresponding to transmission 265 in the figure, eNB 251 transmits the shared spectrum resource information to gNB 253;

Step 6: Corresponding to block 267 in the figure, eNB 251 uses the allocated spectrum resources to perform the 4G traffic data transmission, and gNB 253 uses the shared spectrum resources to perform the 5G traffic data transmission.

In order to solve the problem of the mismatch between the allocated LTE-NR resources and the LTE-NR traffic data amount in the existing technical solutions, certain embodiments according to the present application utilize a dynamic millisecond-level resource allocation method, which utilizes history traffic data of LTE and NR and the principal component analysis algorithm and AI algorithm to predict the LTE-NR traffic data amount of each slot in the next period (a typical value is one frame, 10 ms), and the LTE-NR resource allocation is performed on each slot in the next period based on the predicted LTE-NE traffic data amount. When performing resource allocation, first all the possible LTE-NR resource allocation solutions are generated, then the LTE-NR resource allocation solution that meets the boundary conditions (QoS indicators (such as delay), rate, etc.) is selected, and finally the optimal LTE-NR resource allocation solution is determined by using the AI algorithm in combination with the feedback of the performance indicators.

In other words, in certain embodiments, LTE-NR resource allocation according to the predicted LTE-NR traffic data amount of each slot is performed, and the allocation platform (for example, eNB 251) selects the optimal LTE-NR resource allocation solution according to the feedback of the performance indicator to ensure the QoS of each traffic in LTE-NR and achieves the perfect match between the allocated LTE-NR resources and the upcoming transiently changing LTE-NR traffic data amount, which not only reduces resource waste, but also reduces traffic delay and increases traffic rate.

Figure 3:
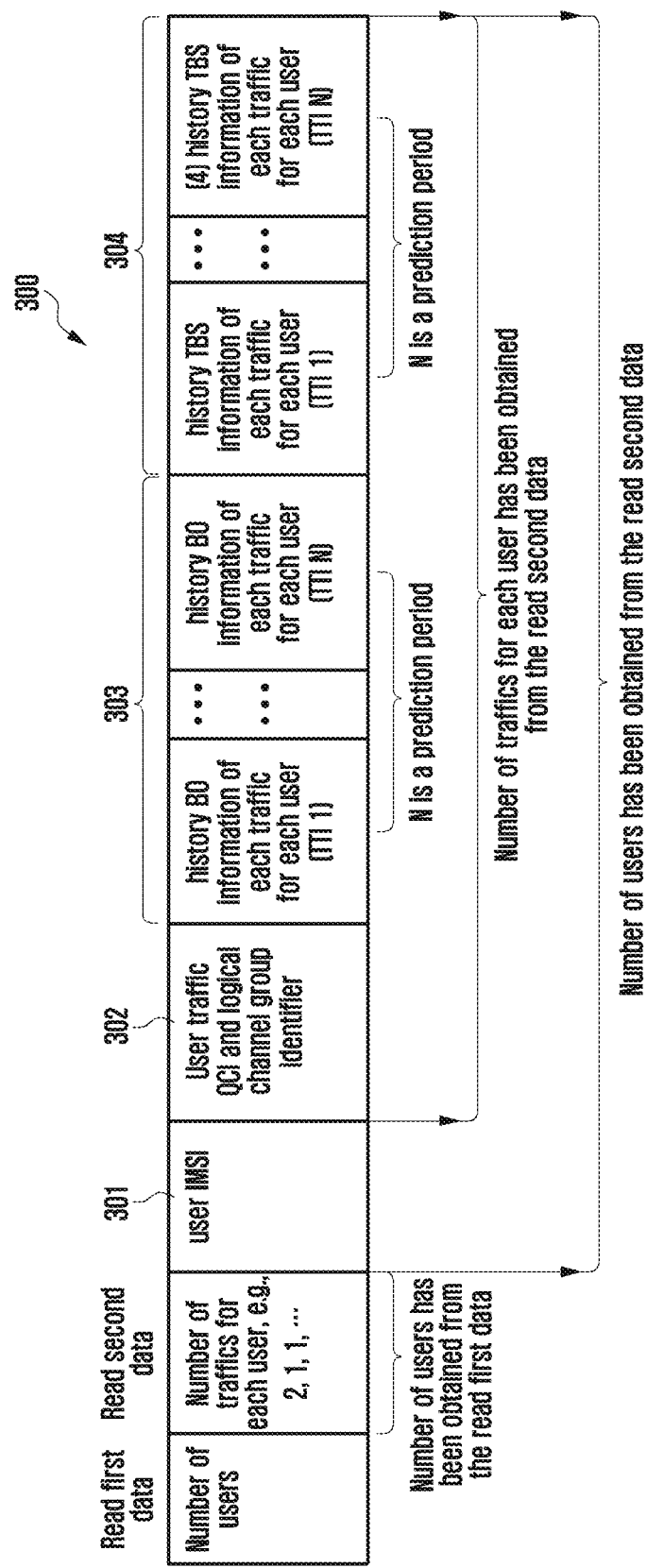
FIG. 3 illustrates an example of a data format of history traffic data according to some embodiments of the present application.
Figure 4:
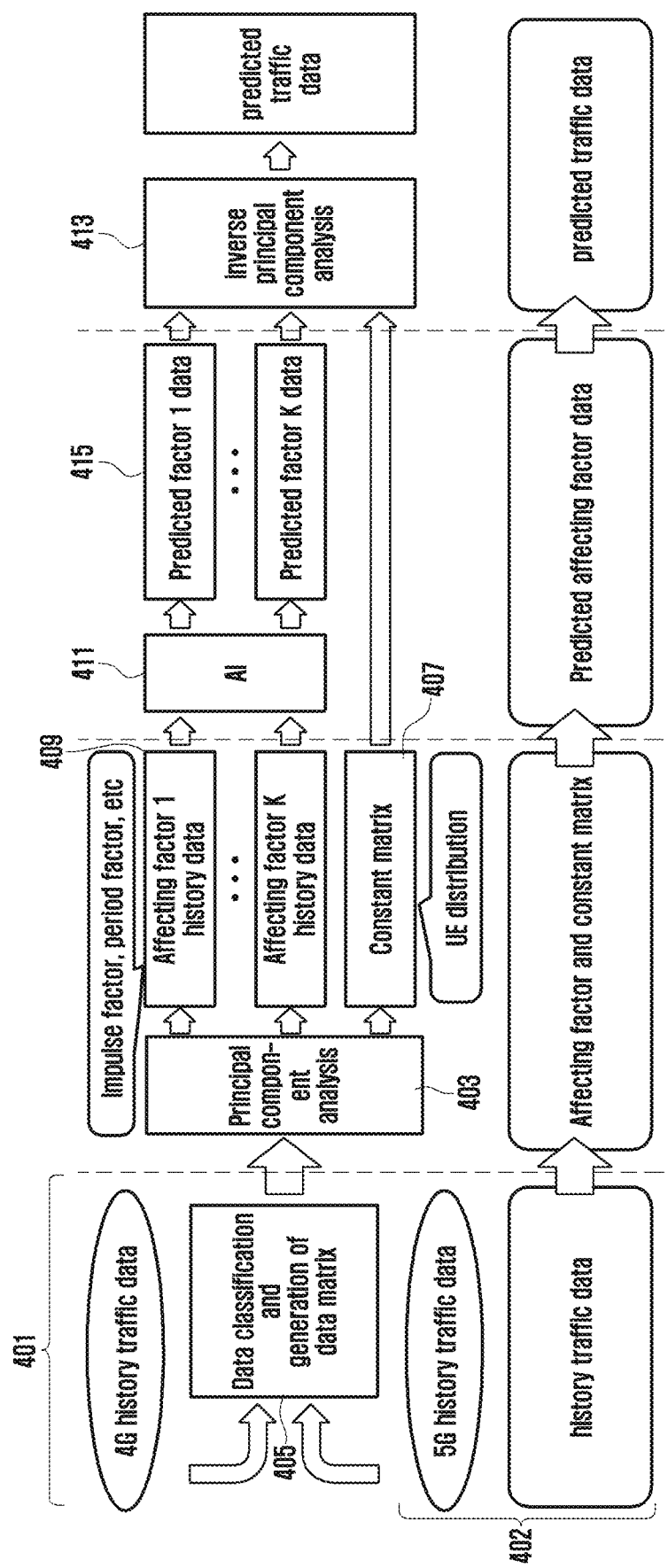
FIGS. 4 and 5 illustrate, in block diagram format, aspects of examples of predicting the new traffic data amount in the next period based on history traffic data according to some embodiments of the present application.
Figure 5:
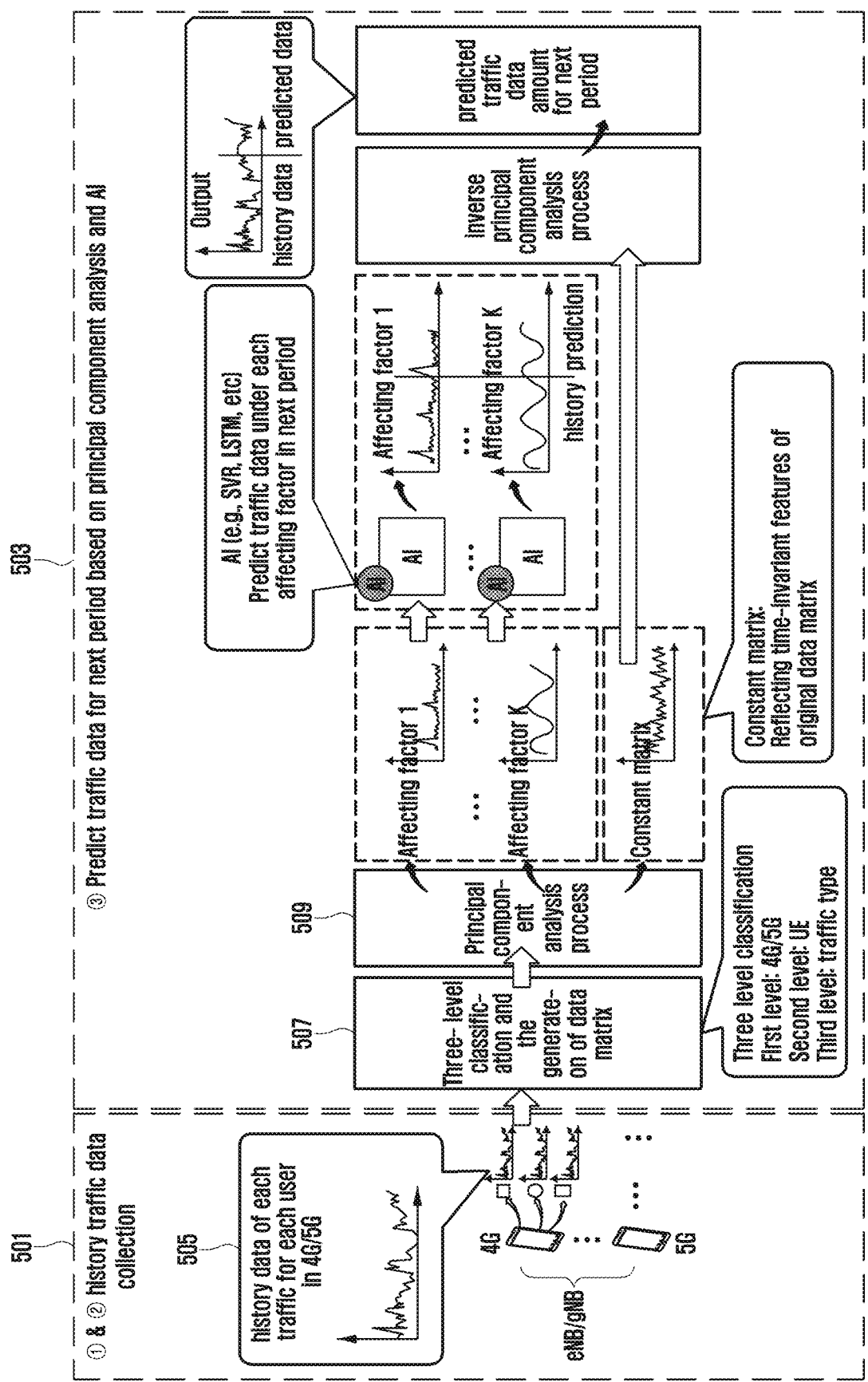

FIG. 3 illustrates an example of a data format 300 of history traffic data according to some embodiments of the present application. FIGS. 4 and 5 illustrate, in block diagram format, aspects of examples of predicting the new traffic data amount in the next period based on history traffic data according to some embodiments of the present application In certain embodiments, spectrum resource allocation is performed as described below.

Step 1 (corresponding to block 255 in FIG. 2): The eNB (for example, eNB 251) collects the history 4G traffic data and stores according to categories.

The history 4G traffic data collected by the eNB may include but is not limited to the following:

IMSI (International Mobile Subscriber Identity) of 4G users, QCI (Quality of Service) Class Identifier (QoS) of 4G traffics, and LCG (logical channel group) identifier, amount of BO (Buffer Occupation) of various traffics for each user on each TTI (Transport Time Interval), and actually transmitted TBS (Transport block size) of each traffic for each user on each TTI (that is, each time unit, one slot).

Step 2 (shown by 402 in FIG. 2): The gNB (for example, gNB 253) collects history 5G traffic data and stores according to categories. The gNB transmits the collected history 5G traffic data to the eNB.

The history 5G traffic information collected by the gNB includes but is not limited to the following:

IMSI of 5G users, the QCI and LCG identifiers of 5G traffics, the BO amount of each traffic for each user on each TTI, and the actually transmitted TBS of each traffic for each user on each TTI.

In certain embodiments, the granularity of the traffic data amount is the data amount of each traffic type of each user of the system corresponding to each time unit of each communication system. Wherein, the above BO amount is the data amount to be transmitted, and TBS is the data amount actually transmitted. IMSI is the unique identifier of the user, QCI characterizes the data transmission requirements of traffic data, and LCG characterizes the traffic type of traffic data.

Wherein, the gNB can transmit the collected history 5G traffic data in a specified format (the data transmission method agreed by the gNB and the eNB). After receiving the data, the eNB reads the data in the specified format to obtain the history 5G traffic data. Specifically, the specific data content transmitted by the gNB to the eNB may include but is not limited to:

1) Item 301, which comprises user IMSI, the absolute unique identifier of the user, used to identify the user;
2) Item 302, which comprises QCI of the user traffic and the corresponding logical channel group information, that is, LCG, used to identify the traffic type and determine its QoS requirements;
3) Item 303, which comprises one or more blocks containing history BO information of each traffic for each user on each TTI, that is, the data amount to be transmitted in the history traffic data, which is used as the learning data of the traffic amount of the AI model in the next period;
4) Item 304, which comprises one or more blocks containing history TBS information of each traffic for each user on each TTI, according to the matching degree of history TBS information and history BO information, the AI model can be continuously adjusted to select the optimal LTE-NR resource allocation solution.

As a further example, the gNB can transmit history 5G traffic data to the eNB according to the data format shown in FIG. 3. As shown in the explanatory example of FIG. 3, N indicates that a prediction period includes N slots (it is TTI in this embodiment, for example, N=10), the first item 305 in the data format (that is the first data) is the number of the users, that is, the gNB transmits the history 5G traffic data to the eNB based on that the collected history 5G traffic data is the traffic data of how many users, the data can be determined according to the user's IMSI. The second item (that is the second data) is the number of traffics (wherein the expression "traffics" encompasses the number of types of traffic types) of each user (for example, where an IMSI is understood as corresponding to a user), which can be determined according to the LCG corresponding to each IMSI, and the 2, 1, 1, . . . , shown in the figure indicate that the number of traffics of the first 5G user is 2, the number of traffics of the second 5G user is 1, and the number of traffics of the third 5G user is 1, etc. The third item is the IMSI of the user (that is, IMSI of each user), the fourth item is the QCI and LCG of the traffic corresponding to each user, and the following items are the BO information and TBS information of each user corresponding to each TTI, as shown in item 5, as shown in the figure "(3) History BO information of each traffic for each user (TTI1)" represents the BO information of each traffic type of each user corresponding to the first TTI, that is, the data amount to be transmitted. For another example, "(4) History TBS information of each traffic for each user (TTI1)" represents the TBS information of each traffic type of each user corresponding to the first TTI, that is, the actually transmitted data amount.

After the gNB transmits the history 5G traffic data to the eNB according to the format shown in FIG. 3, the eNB can read the data in a corresponding manner. As shown in the figure, the number of users can be obtained by reading the first item, the traffic data of each user can be obtained by reading the second item, and the IMSI of each user can be obtained by reading the third item.

Step 3 (corresponding to block 261 in FIG. 2): Predicting the LTE-NR traffic data amount of each TTI in the future based on the principal component analysis algorithm 403 and AI model 405, that is, predicting the 4G new traffic data amount of each time unit in the next period (first new traffic data amount) and 5G new traffic data amount (second new traffic data amount). As shown in FIG. 4, the main flow of this step is as follows:

First, the eNB can classify the stored history 4G and 5G data, and generate a data matrix (that is, the history traffic data matrix) based on the classified data, as the main input of the principal component analysis algorithm, that is, classifying the data and generating the data matrix shown in FIG. 4.

Second (corresponding to the steps of the affecting factor and constant matrix column shown in FIG. 4), based on the principal component analysis algorithm 403, the history traffic data matrix can be decomposed into a time-invariant constant matrix 407 (that is a time-invariant traffic data feature matrix) and a time-varying history data matrix (the first time-varying traffic data feature matrix) under some main affecting factors.

It can be seen from the above description that the time-varying traffic data of users is caused by a time-invariant constant affecting factor and a time-varying affecting factor. The constant affecting factor is related to the user's own attributes and is time-invariant, such as the user equipment only supports 4G or supports both 4G and 5G. The time-varying affecting factor is related to traffic features. The data under the time-varying affecting factor is a function of time t, such as video traffics have periodic features, and network browsing or instant messages have impulsive features. It is difficult and less accurate to directly predict time-varying user traffic data affected by multiple factors. The summary of the embodiments of the present application can disassemble the user's history traffic data into a constant matrix under a constant affecting factor (that is the time-varying traffic data, as shown in FIG. 4, corresponding to the constant matrix under the constant affecting factor of the UE distribution) and the history data (that is, the first time-varying traffic data, such as the time-varying history data (history data of affecting factor 1 shown in the figure) corresponding to affecting factor 1 as shown in the figure), . . . , history data of affecting factor K, etc.), and predict the data (second time-varying traffic data) in the next period under multiple time-varying affecting factors, and combine the data under the constant time-varying affecting factor and the predicted data under multiple time-varying affecting factors, that is the predicted user's traffic data in the next period.

After that, corresponding to the step of predicting the affecting factor data shown in FIG. 4, the AI model 411 can be used to predict the data for a period of time in the future based on the time-varying history data under several main affecting factors, that is, the second time-varying traffic data matrix obtained by prediction through the pre-trained AI model based on the first time-varying traffic data matrix. As shown in FIG. 4, the time-varying history data under several main affecting factors can be input into AI model 411, and data corresponding to each slot in the next period under each affecting factor can be predicted.

Finally, corresponding to the step of predicting the traffic data shown in FIG. 4, the predicted traffic data can be obtained by synthesis by using the inverse principal component analysis algorithm 413 based on the predicted data of several affecting factors and the time-invariant constant matrix 407, that is, the predicted new traffic data amount.

Step 3 will be described in detail below in conjunction with the non-limiting example of FIG. 5. FIG. 5 shows a schematic flowchart of an implementation of this step (step ③ in the figure), and steps ① and ② in the figure correspond to the steps of collecting history traffic data and the 5G base station transmitting the 5G history traffic data to the 4G base station, as shown in FIG. 5, the implementation of this optional embodiment may include the following steps:

1) History traffic data 505 can undergo 3-level classification 507 and generate a data matrix, that is, history traffic data matrix (corresponding to the 3-level classification and the generation of a data matrix shown in FIG. 5)

Figure 6:
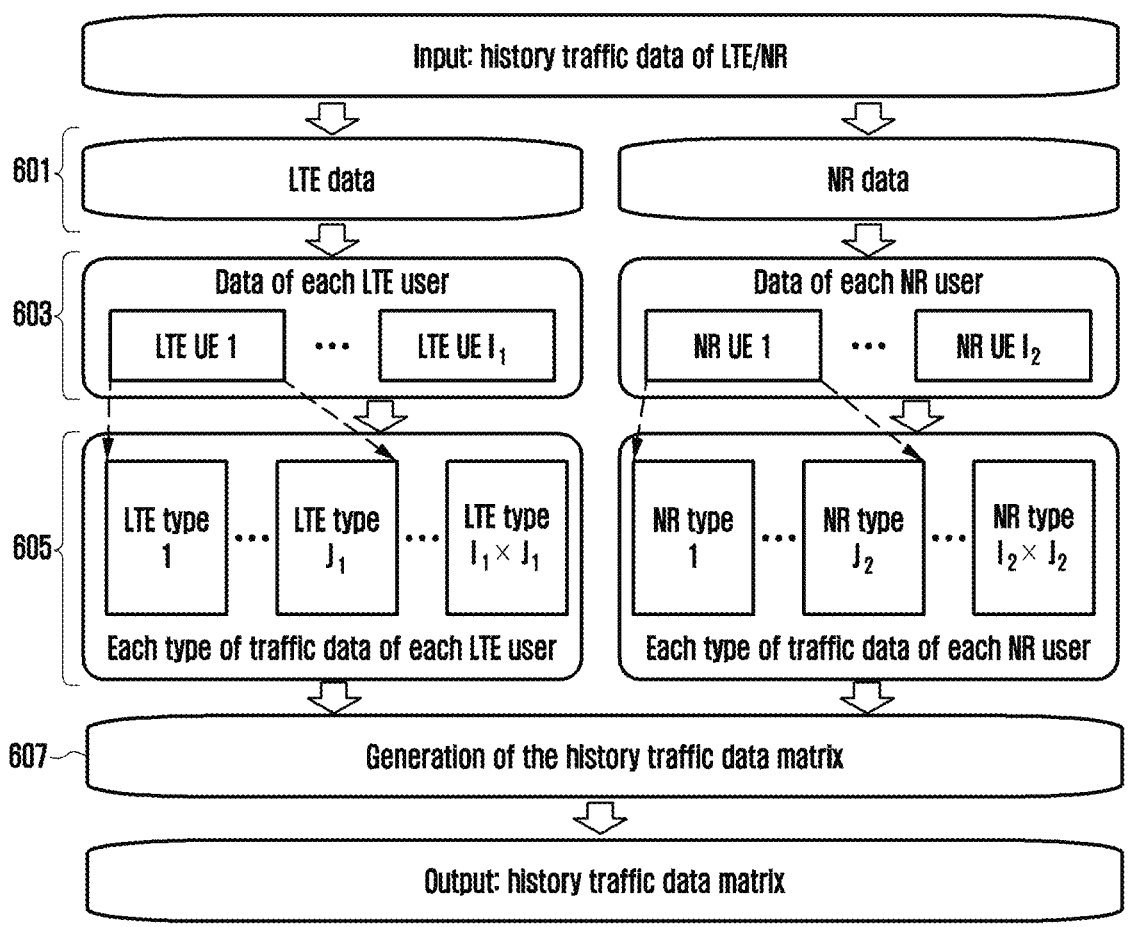
FIG. 6 illustrates operations of an example of classification processing of history traffic data according to various embodiments of the present application.

The operations underlying 3-level classification 507 in certain embodiments, are described in greater detail in FIG. 6, and can include:

A first level classification 601 to distinguish whether the data is LTE data (4G data) or NR data (5G data). This classification is to classify history traffic data according to the RAT system to which the data belongs. Data is classified into 4G data (first history traffic data) and 5G data (second history traffic data).

The second level classification 603 in which a user-level distinction is made on the basis of the first level classification, that is, 4G data is further classified into 4G traffic data for each user, and 5G data is classified into the 5G traffic data of each user. Assuming that 4G corresponds to 11 users and 5G corresponds to 12 users, traffic data passing through the user level classification can be expressed as LTE UE 1, ..., LTE UE I1, NR UE 1, ..., NR UE I2, wherein LTE UE 1 and LTE UE 11 represent the traffic data of the first user under 4G and the traffic data of the eleventh user respectively, and NR UE 1 and NR UE 12 represent the traffic data of the first user and the traffic data of the twelfth user under 5G.

A third level classification 605, comprising a traffic-level classification performed on the basis of the second level classification. The traffic level distinction is the further classification according to the traffic types. For example, LTE users have at most J1 traffics, and NR users have at most J2 traffic. The classification is to refine the data after the second level classification according to each traffic. LTE type 1 to LTE type J1 as shown in FIG. 6 respectively represent the traffic data (that is, the history traffic data amount) from the first traffic type to the J1 traffic type of the first LTE user under 4G, similarly NR type I2×J2 represents the traffic data of the J2 traffic type (that is, the history traffic data amount) of the 12th user under 5G.

After the above three levels classification, the history traffic data is classified into the traffic data of each traffic type of each user under each RAT system. Based on the above three-level data classification, the generated history traffic data matrix 607 can be expressed as:

$$\begin{bmatrix} 4GBO_1(1) & 4GBO_1(2) & \ldots & 4GBO_1(t) & \ldots \\ \vdots & \vdots & \ddots & \vdots & \vdots \\ 4GBO_N(1) & 4GBO_N(2) & \ldots & 4GBO_N(t) & \ldots \\ 5GBO_1(1) & 5GBO_1(2) & \ldots & 5GBO_1(t) & \ldots \\ \vdots & \vdots & \ddots & \vdots & \vdots \\ 5GBO_M(1) & 5GBO_M(2) & \ldots & 5GBO_M(t) & \ldots \end{bmatrix}$$

All the 4G and 5G history traffic data are included in the history traffic data matrix. Wherein, the rows of the matrix are all the traffics of all the UE, that is, the number of rows is $N+M$, where $N=I1 \times J1$ and $M=I2 \times J2$. The columns of the matrix are the number of total time slots of the history period corresponding to the history traffic data, which can be expressed as time $t=\{1, 2, 3, \ldots\}$ TTI, and 1 TTI represents the first time slot of the history period. The BO in the matrix represents the data amount to be transmitted, and is the representation of the data amount in the MAC layer (Media Access Control Layer). $4GBON(t)$ represents the history time-varying traffic amount of a certain 4G traffic (including the time-invariant part and the data amount of the time-varying part), specifically representing the history traffic data amount of the Jlth traffic of the I1th user in the tth time slot under 4G, $5GBOM(t)$ represents the history time-varying traffic amount of a certain 5G traffic.

The value of any element in the history traffic data matrix represents the history traffic data amount of one traffic type of one user corresponding to one-time unit under 4G or 5G (time slot in this example), specifically represents the history traffic data amount of the J2th traffic of the I2th user in the tth time slot under 5G.

2) Subsequent to performing the three-level classification described with reference to FIG. 6, a principal component analysis process 509 is performed.

According to certain embodiments, a principal component analysis algorithm can reduce the dimension of the time-varying data matrix (history traffic data matrix) into a time-varying data array (the first time-varying traffic data feature matrix) and a time-invariant constant matrix (time-invariant traffic data feature matrix) under several main affecting factors, which helps reduce the complexity of subsequent AI model prediction data and improve the accuracy.

The input of the principal component analysis algorithm is the data matrix generated by three-level classification, that is, the above matrix. The row of the matrix is $N+M$, the column of the matrix can be marked as T, and the history traffic data matrix can be expressed as the input matrix $[(N+M) \times T]$, each row of the matrix represents the BO amount of a user's traffic at different time points (time units), different rows represent different traffics of different users, and each column of the matrix represents the BO amount of different traffics of different users at the same time point, different columns represent different time points t, wherein $t=\{1, 2, 3, \ldots, T\}$.

Figure 7:
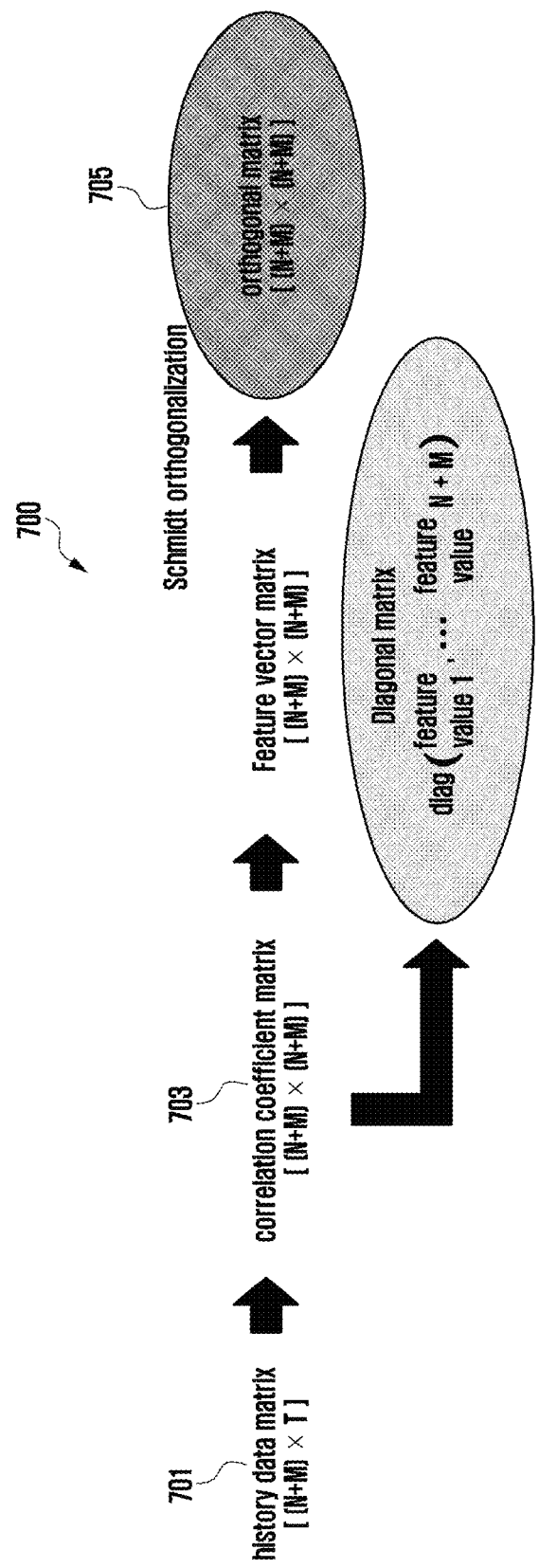
FIG. 7 illustrates, operations of an example method of obtaining a time-invariant traffic data feature matrix based on a history traffic data feature matrix according to various embodiments of the present application.

The dimensionality of the history traffic data matrix is reduced by the principal component analysis algorithm to obtain a constant orthogonal matrix and a time-varying matrix. FIG. 7 illustrates operations of an example method 700 for obtaining a constant orthogonal matrix and a time-varying matrix according to some embodiments of this disclosure.

First, obtain the time-invariant constant orthogonal matrix: based on the history traffic data matrix 701, through the principal component analysis algorithm, the correlation coefficient matrix 703, comprising [(N+M)×[N+M] can be obtained, which is a diagonal matrix. The number of rows and columns of the matrix is N+M, and then the eigenvalues of the correlation coefficient matrix are calculated (as shown in the diagonal matrix in FIG. 7, the element values in the matrix are the eigenvalues of the correlation coefficient matrix, and the eigenvalues N+M represents the (N+M)th eigenvalue) and the eigenvector matrix. The constant orthogonal matrix 705 obtained by Schmidt orthogonalization of the eigenvector matrix can be used as a constant matrix.

Secondly, based on the input history data matrix 701 and the obtained constant orthogonal matrix, a time-varying matrix is calculated: as shown in FIG. 8, the adjoint matrix 801 of the orthogonal matrix (i.e., constant matrix) and the history traffic data matrix are multiplied to obtain a time-varying traffic data matrix 805, wherein the number of rows and columns of the matrix is the same as the number of rows and columns of the history traffic data matrix.

Figure 9:
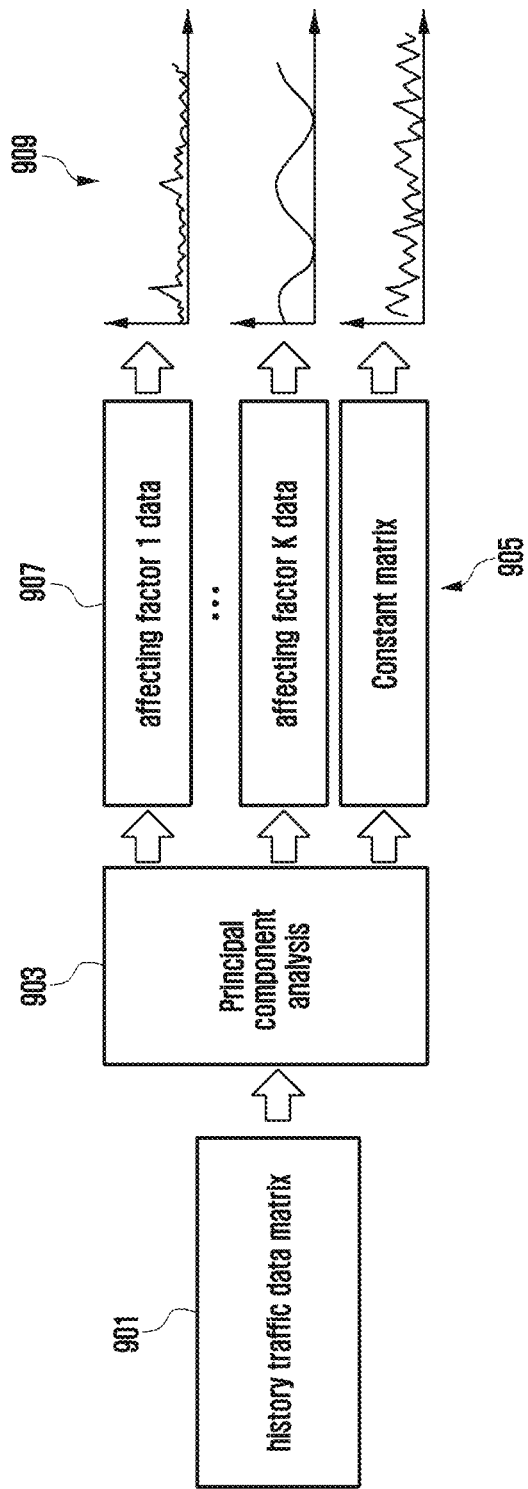
FIG. 9 illustrates aspects of an example of decomposing history traffic data into time-invariant data and time-varying data through a principal component analysis algorithm according to certain embodiments of the present application.

According to various embodiments, the process of obtaining a constant matrix and a time-varying matrix through the principal component analysis algorithm can be shown with reference to FIG. 9. Referring to the illustrative example of FIG. 9, through principal component analysis 903 a history traffic data matrix 901 can be converted into a constant matrix 905 and the traffic data under each time-varying affecting factor. For example, the affecting factor 1 data 907 shown in the figure represents the time-varying traffic data amount corresponding to affecting factor 1, wherein waveform 909 represents the change relationship between the time-variant traffic data amount and time, and the constant matrix is a time-variant traffic data matrix, it can be seen from the corresponding waveform diagram that the time-invariant traffic data basically does not change with time, and is relatively time-invariant.

It can be seen that the output of the principal component analysis algorithm includes the orthogonal constant matrix and the time-varying matrix. The orthogonal constant matrix is the time-invariant traffic data matrix under the corresponding constant affecting factor, which is related to the user's own attributes and is time-invariant, the matrix will be used as the input of the inverse principal component analysis algorithm to calculate the new traffic data amount in the next period.

Figure 10:
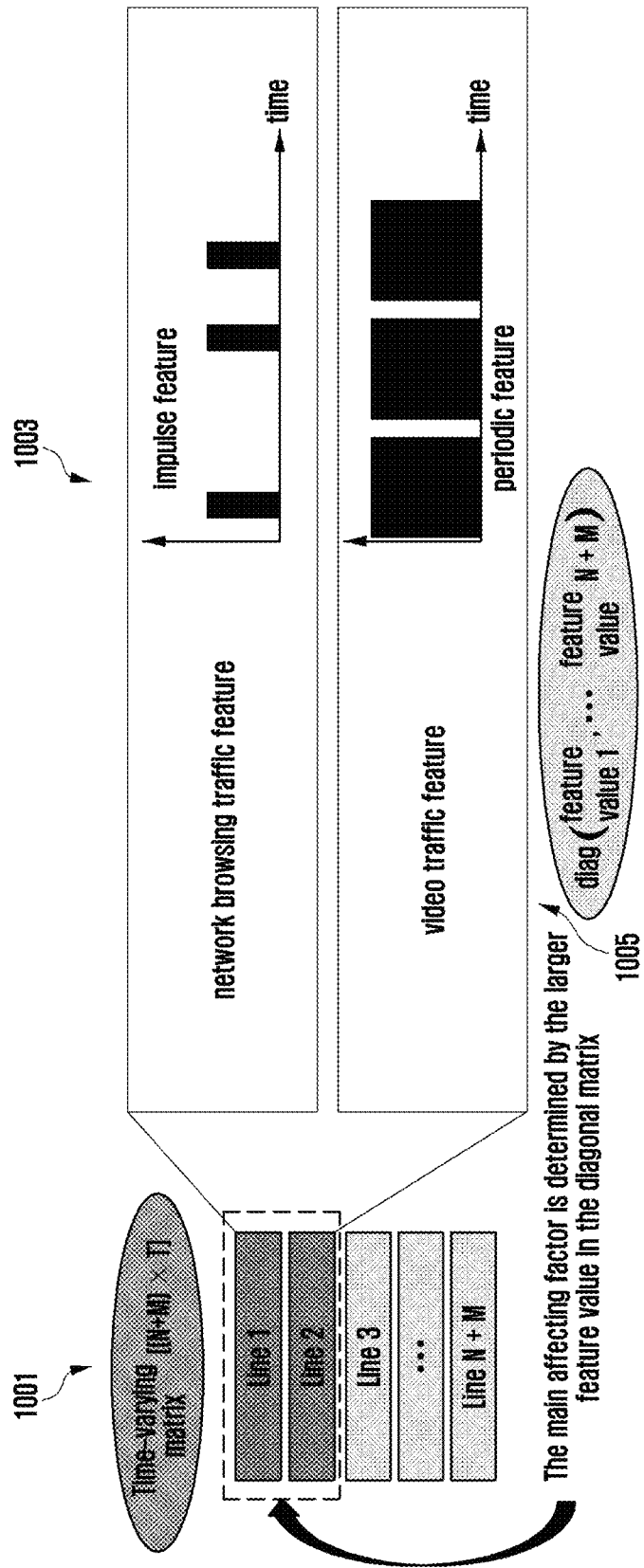
FIGS. 10 and 11 illustrate aspects of an example of the time-varying matrix according to certain embodiments of the present application.

FIG. 10 provides a visualization of the contents of time-varying matrix 1001. Different rows in the matrix represent different affecting factors. These affecting factors are related to the traffic type and show different features, the network browsing type traffic 1003 has impulse features and video type traffic 1005 has periodic features. The main affecting factor of traffic data is determined by the larger eigenvalue in the above diagonal matrix. One row of the time-varying matrix corresponds to one eigenvalue, that is, corresponds to an affecting factor.

3) Returning to the illustrative example of FIG. 4, AI prediction traffic data, for example, predicted factor 1 data 415 is obtained.

User traffic data is time-varying, such as the traffic amount of the instant messaging can change within 1 ms. It is difficult to directly predict the user's traffic data to achieve such a rapid traffic amount change. Therefore, the AI algorithm can be used to predict the data under the main affecting factors output by the principal component analysis, with low complexity and high accuracy. Specifically, the AI model can be used to make a prediction based on the history data array under several main affecting factors (that is, the above time-varying matrix) to obtain the data in the next period.

Wherein, the input of the AI model is the history time-varying data array under the main affecting factor output by the principal component analysis algorithm, and the output of the AI model is the predicted time-varying data array under the main affecting factor, which corresponds to the time-varying traffic data matrix of the second period in the next period. The data processing principle of the AI model can be expressed as follows:

Predicted data amount'$_{t+1}$=Actual data amount'$_t$+Variation'$_t$

Actual data amount'$_t$=$W_1$·Actual data amount$_t$+(1−$W_1$)·(Actual data amount'$_{t-1}$+Variation'$_{t-1}$)

Variation'$_t$=$W_2$·(Actual data amount'$_t$−Actual data amount'$_{t-1}$)+(1−$W_2$)·Variation'$_{t-1}$ Wherein, $W_1$ and $W_2$ are the model parameters of the AI model. During the model training process, for the training sample data, Predicted data amount'$_{t+1}$ represents the predicted data amount of the (t+1)th moment (that is, the (t+1)th time unit, such as the (t+1)th slot) output by the model, when the input of the AI model is the history time-varying traffic data and the output is the predicted time-varying traffic data, the predicted data amount is the traffic data amount at the (t+1)th moment predicted and output by the model; Actual data amount'$_t$ represents the actual data amount predicted at moment t, Actual data amount'$_{t-1}$ represents the actual data amount predicted at moment t−1, Actual data amount'$_{t-1}$+Variation'$_{t-1}$ represents the predicted data amount at moment t output by the model, Actual data amount$_t$ represents the real traffic data amount (the real traffic amount has occurred at the current moment, and the base station can obtain it) at moment t, Actual data amount'$_t$ is obtained by a weighted summation of the real traffic data amount at moment t and the predicted data amount at moment t based on the model parameter W1, which can be understood as: obtaining the predicted real data amount through the model parameter correction calculation according to the real traffic data amount at moment t and the predicted data amount at moment t; Variation'$_t$ represents the predicted data amount change at moment t, Actual data amount'$_t$−Actual data amount'$_{t-1}$ represents the difference between the predicted actual data amount at moment t and the predicted actual data amount at moment t−1, Variation'$_{t-1}$ represents the predicted data change at moment t−1. The Actual data amount'$_t$−Actual data amount'$_{t-1}$ and the Variation'$_{t-1}$ are respectively weighted and summed based on the model parameter W2 to obtain the Variation'$_t$.

During the training period of the model, in certain embodiments, the difference between the actual data amount (time-varying traffic data amount of sample data) and the predicted data amount in the training set can be calculated, and it is possible to continuously adjust W1 and W2 to make the difference between the actual data amount and the predicted data amount is the minimum, to obtain a trained AI model for data prediction. As another alternative, after predicting the time-varying traffic data through the AI model, the alternative solution can also calculate the predicted new traffic data amount (including the time-varying traffic data amount and the time-invariant traffic data amount) based on the time-varying traffic data amount and the corresponding time-invariant traffic data amount, and calculate the difference between the predicted new traffic data amount and the actual new traffic data amount at the corresponding moment in the sample data, adjust the model parameters according to the difference, such that the difference between the predicted new traffic data amount and the corresponding real new traffic data amount is continuously reduced until the preset training end conditions are met, accordingly, a trained AI model is obtained.

Figure 11:
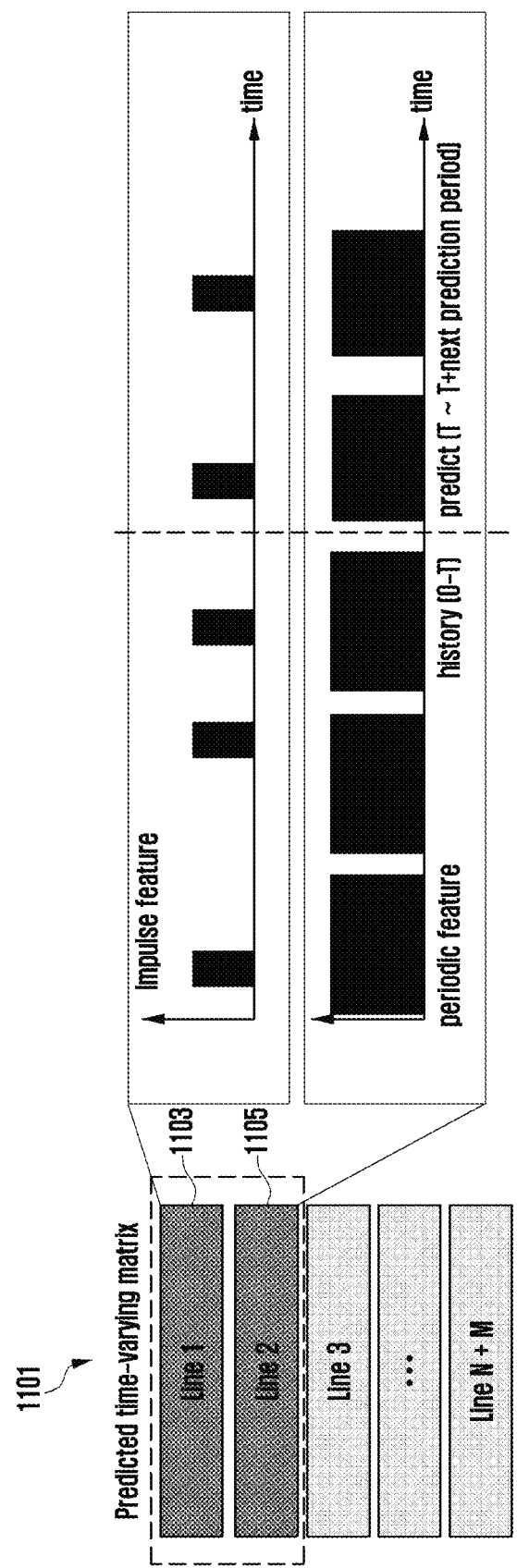

By inputting the time-varying matrix of history traffic data into the trained AI model, the time-varying matrix in the next period can be predicted through the model. FIG. 11 illustrates aspects of example of data prediction through an AI model according to certain embodiments of this disclosure. Time-varying matrix 1101 represents the output of the trained AI model. Each row of the matrix corresponds to the time-varying traffic data amount in the next period corresponding to a time-varying affecting factor, first row 1103 shown in the figure corresponds to the traffic data with impulse features, and second row 1105 corresponds to the traffic data with periodic features. Through the AI model, the time-varying data amount of each time slot of the next prediction periods can be predicted, T in FIG. 11 represents the time division point between a history period and a first prediction period. The prediction (T~T+next prediction period) represents the time range of the next prediction period. The histogram in the figure represents the time-varying data amount of the traffic of each traffic feature, the history time-varying data amount before moment T, and the time-varying data amount corresponding to the next period obtained after moment T.

It should be noted that, in the embodiments of the present application, the specific model architecture of the AI model is not limited to architectures described with reference to the examples of the present application, and may be configured according to actual needs, and may include but not limited to Long Short-Term Memory (LSTM), SVR (support vector regression), etc.

4) Returning to the illustrative example of FIG. 4, inverse principal component analysis process 413 (corresponding to the step of obtaining the predicted traffic data amount in the next period through the inverse principal component analysis process based on the constant matrix and AI output shown in FIG. 5) is performed.

In this step, through the time-invariant orthogonal constant matrix and the predicted time-varying matrix (the predicted data under several main affecting factors), the user traffic data matrix in the next prediction period (i.e., the time-varying matrix in the next period) is calculated. Like the data matrix of the input principal component analysis, the data matrix output by the inverse principal component analysis algorithm is also the data of each traffic for each user under 4G/5G.

Figure 12:
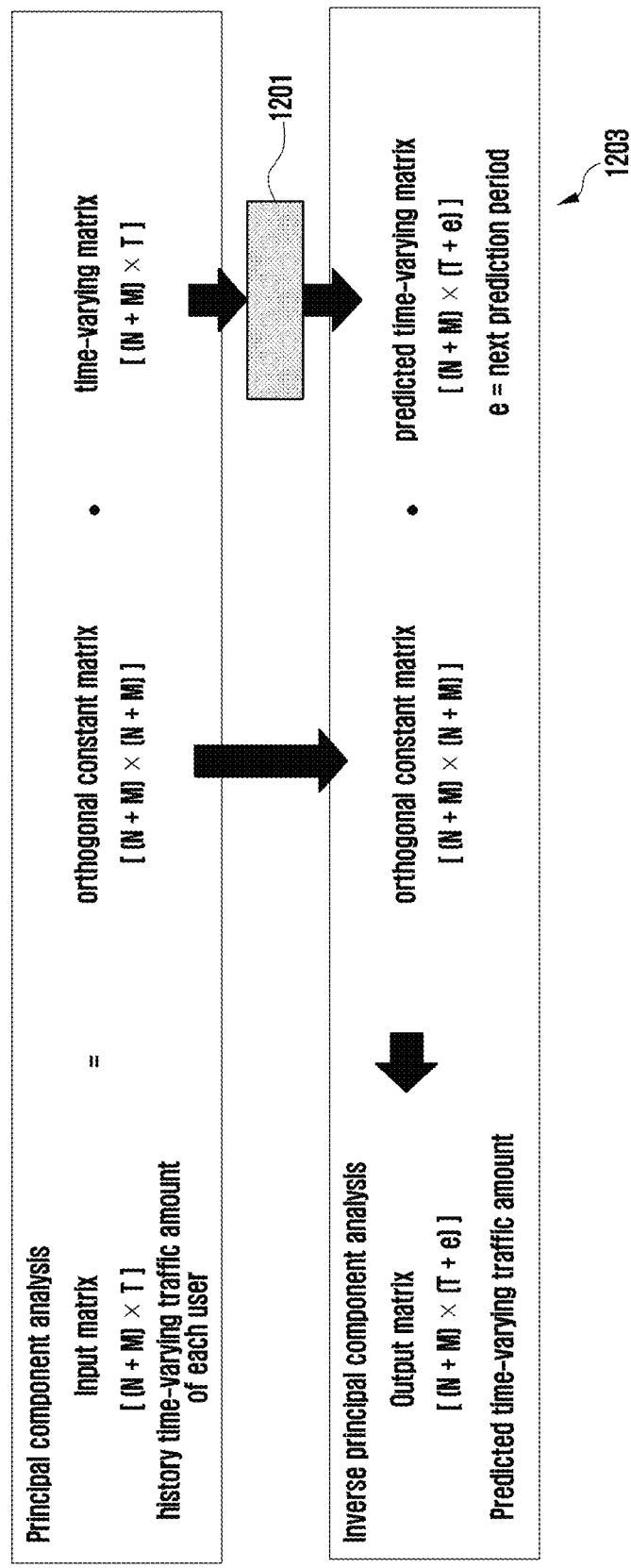
FIGS. 12 and 13 illustrate aspects of obtaining predicted traffic data amount through an inverse principal component analysis algorithm according to various embodiments of the present application.
Figure 13:
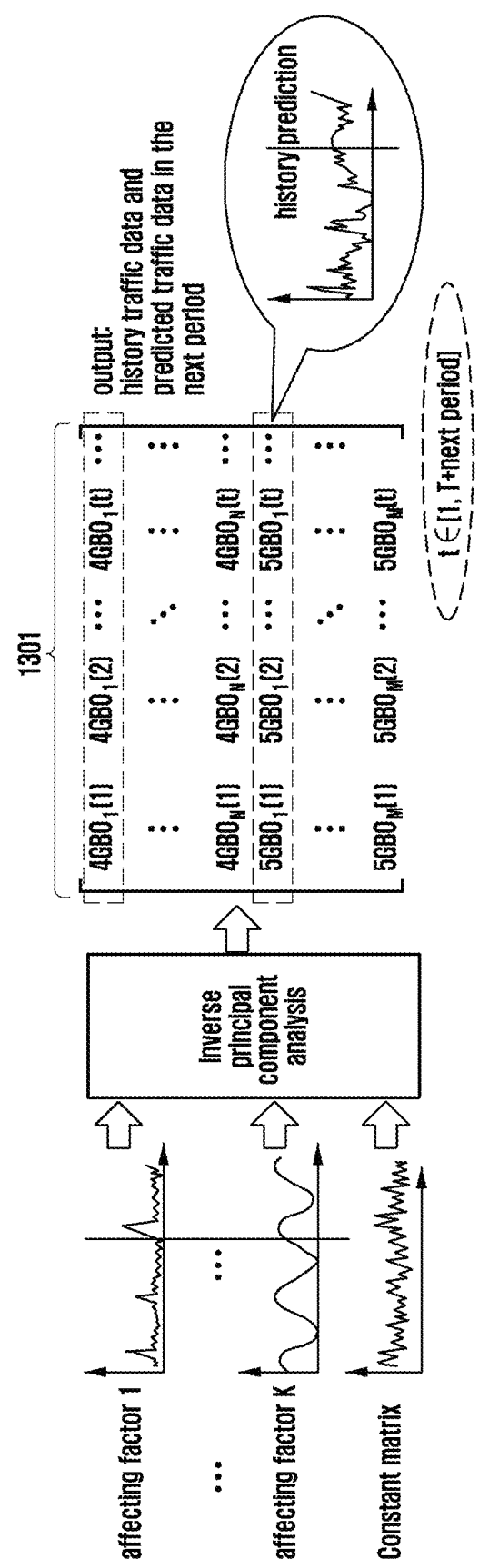

FIG. 12 illustrates aspects of an inverse principal component analysis algorithm suitable for use at block 413, and FIG. 13 illustrates aspects of the flow of predicting data by the inverse principal component analysis algorithm according to certain embodiments of this disclosure. For clarification, box 1201 in FIG. 12 represents processing steps of the principal component analysis algorithm. This step is to obtain the orthogonal constant matrix and the history time-varying matrix based on the history traffic data matrix (input matrix in the figure). The dotted box at the bottom of the figure is the step of predicting the new traffic data amount in the next period by the inverse principal component analysis algorithm based on the obtained time-varying matrix and constant matrix in the next period. The output matrix in 1203 FIG. 12 (which corresponds to matrix 1301 in FIG. 13) is the predicted new traffic data matrix in the next period. The value of any element in the matrix represents the new traffic data amount of a certain traffic type of a certain 4G or 5G user in a certain slot in the next period. 5GBOM(t) shown in FIG. 13 represents the new traffic data amount of the J2th traffic of the 12th user of the 5G system in the tth slot in the next period.

Step 4 (corresponding to block 263 in FIG. 2): determining the optimal LTE-NR resource allocation solution on each slot, based on the predicted LTE-NR traffic data amount, by using the AI algorithm in combination with the feedback of the performance indicator.

Figure 14:
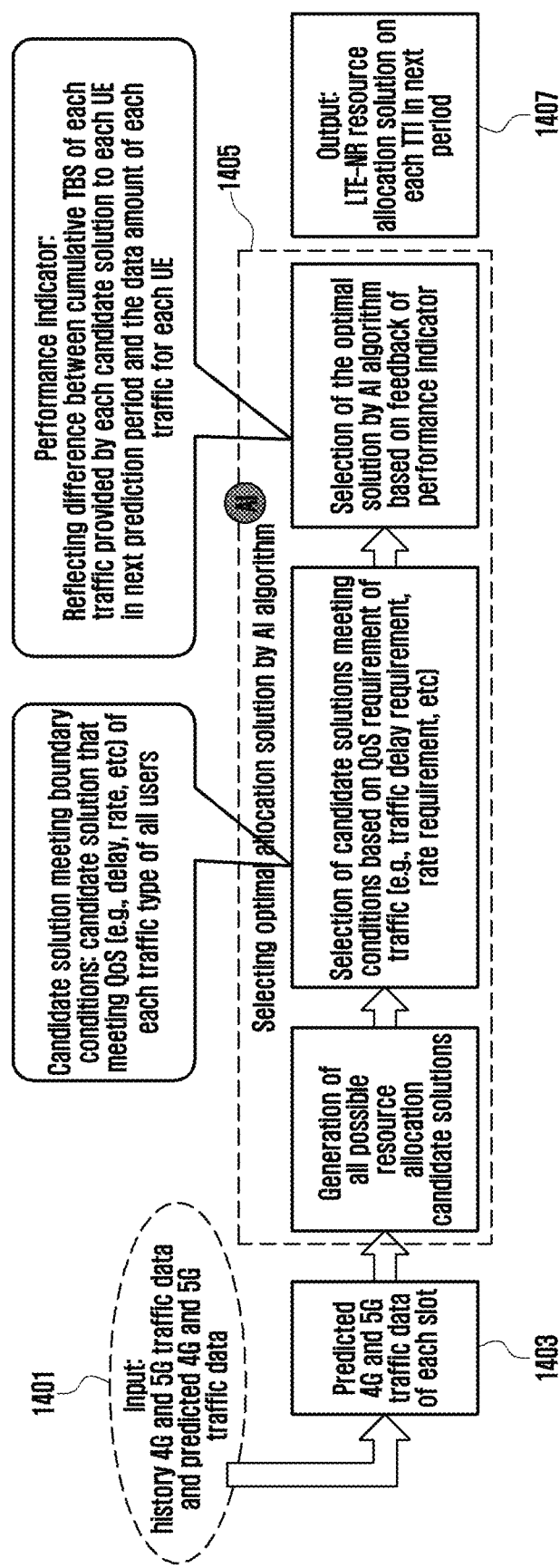
FIG. 14 illustrates operations of an example of determining a target resource allocation solution according to certain embodiments of the present application.

FIG. 14 illustrates aspects of determining an optimal LTE-NR resource allocation on each slot, according to various embodiments of this disclosure. Input 1401 includes history data (used for calculating history legacy traffic amount) and predicted 4G and 5G traffic data (new data amount). At block 1403, the total data amount on each slot (the predicted 4G and 5G traffic data of each slot shown in the figure) based on the input is calculated, and then, at block 1405, the final target allocation solution based on the total data amount on each slot is determined. The following is a detailed description in conjunction with FIG. 14, which can be divided into the following steps 1) and 2), which are specifically as follows:

1) (Represented by block 1403) Calculating the data amount required for resource allocation in the next period.

The data amount obtained in step 3 (corresponding to block 261 in FIG. 2) is the new data amount corresponding to each slot in the next period. However, in actual applications, the legacy traffic data amount is likely to exist in the history period. Therefore, it is necessary to calculate the total data amount of the traffic data of each traffic type of each user corresponding to each slot in the next period, that is, the traffic data amount that each slot needs to allocate spectrum resources. Specific implementation can be divided into the following two steps:

First, the history legacy traffic data amount, which is a component of block 1401, is calculated. For any RAT system of 4G and 5G, first, the history legacy traffic amount (t) (t≤T) can be calculated by the following expression:

$$\text{History legacy data amount }(t) = \text{total history traffic data amount }(t) - \text{history transmission traffic data amount }(t) \qquad (a)$$

Wherein, T represents the total duration of the saved history traffic data, which can also be understood as the time at which the data amount in the next period is currently predicted at moment T (the last time unit in history), and t represents the tth time unit in the history period, the history legacy traffic amount (t) represents the history legacy traffic amount of the tth time unit in history, and the total history traffic amount (t) represents the total data amount to be transmitted at the tth time unit and before the tth time unit. History transmission traffic amount (t) represents the total data amount actually transmitted at the tth time unit and before the tth time unit.

Figure 15:
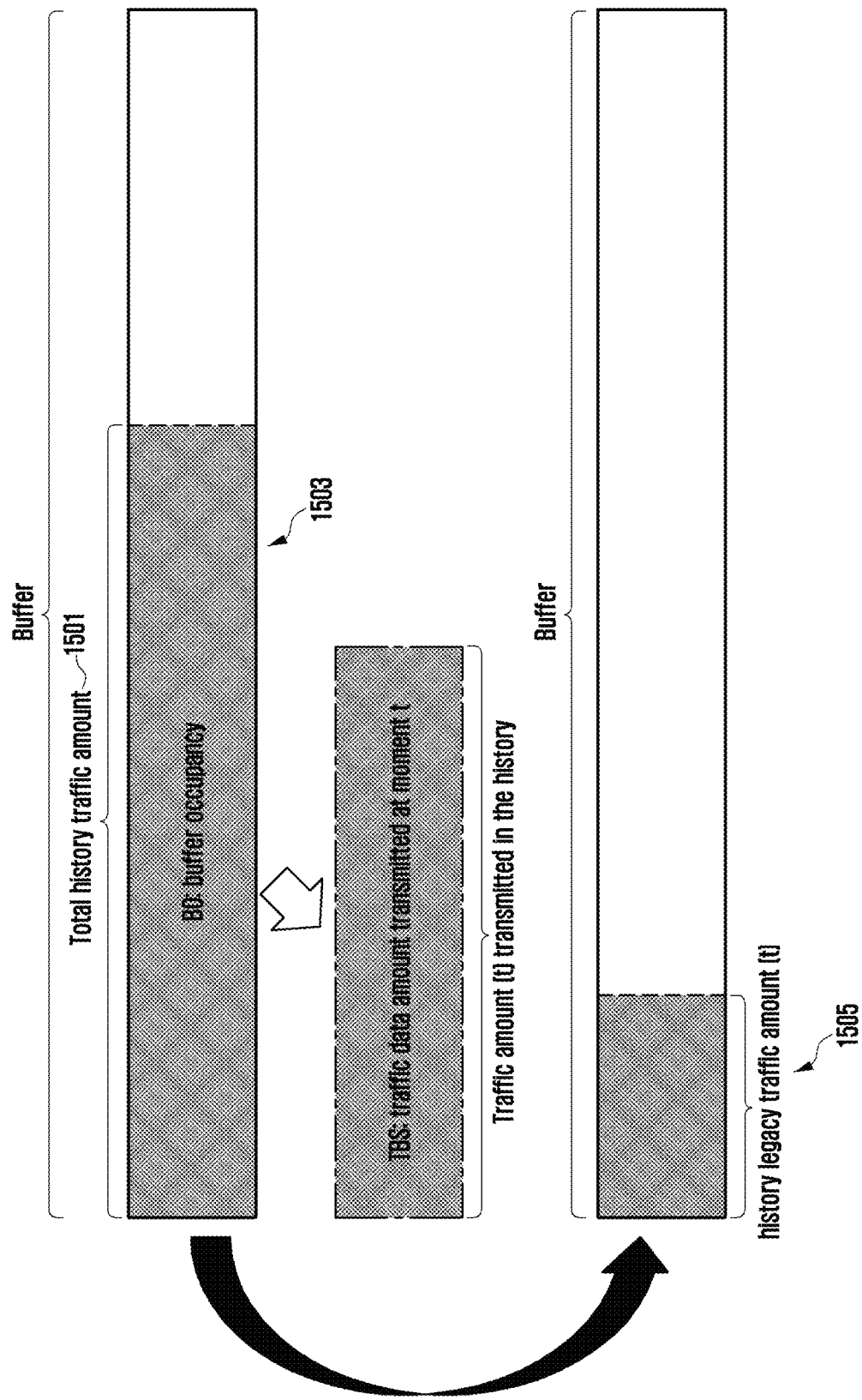
FIG. 15 illustrates aspects of an example of determining the history legacy traffic data amount according to some embodiments of the present application.

Referring to the illustrative example of FIG. 15, the total history traffic amount (t) represents the data amount to be transmitted at moment t (that is, the tth slot) in the history traffic data, that is, the BO buffer occupancy, and the traffic amount (t) transmitted in history represents the data amount that has been transmitted at moment t in the history traffic data, that is, the TBS actually transmitted, and the difference between the two parts is the history legacy data amount (t) corresponding to moment t.

Based on the above method, the history legacy traffic amount (T) 1505 of the Tth time unit can be determined, that is, the total legacy data amount corresponding to the history traffic data.

After the history legacy traffic data amount 1501 is calculated, the total data amount corresponding to each slot in the next period can be calculated, which can be calculated based on the following expression:

Predicted total traffic amount (T+n)=predicted traffic amount (T+n)+legacy traffic amount (T+n−1)  (b)

Legacy traffic amount (T+n−1)=predicted total traffic amount (T+n−1)−transmission data amount (T+n−1)  (c)

Predicted total traffic amount (T)=history legacy traffic amount (T)  (d)

Wherein, the predicted total traffic amount (T+n) represents the total traffic amount of the nth slot in the next period, and the predicted traffic amount (T+n) represents the new traffic amount of the nth slot in the next period, that is, the time-varying data amount obtained by the inverse principal component analysis algorithm in step 3, the legacy traffic amount (T+n−1) represents the legacy traffic amount of the (n−1)th slot in the next period, and the legacy traffic amount corresponding to the first slot in the next period is the history legacy traffic amount (T), that is, the addition of the history legacy traffic amount (T) and the new data amount of the first slot is the total traffic amount of the first slot. At the end of the data transmission in the first slot, the legacy traffic amount (T+1) can be determined according to the total traffic amount of the first slot and the actually transmitted data amount, and the legacy traffic amount (T+1) and the new data amount of the second slot are added to obtain the total data amount of the second slot. Based on the above expressions, and so on, the total data amount of each slot can be obtained.

Figure 16:
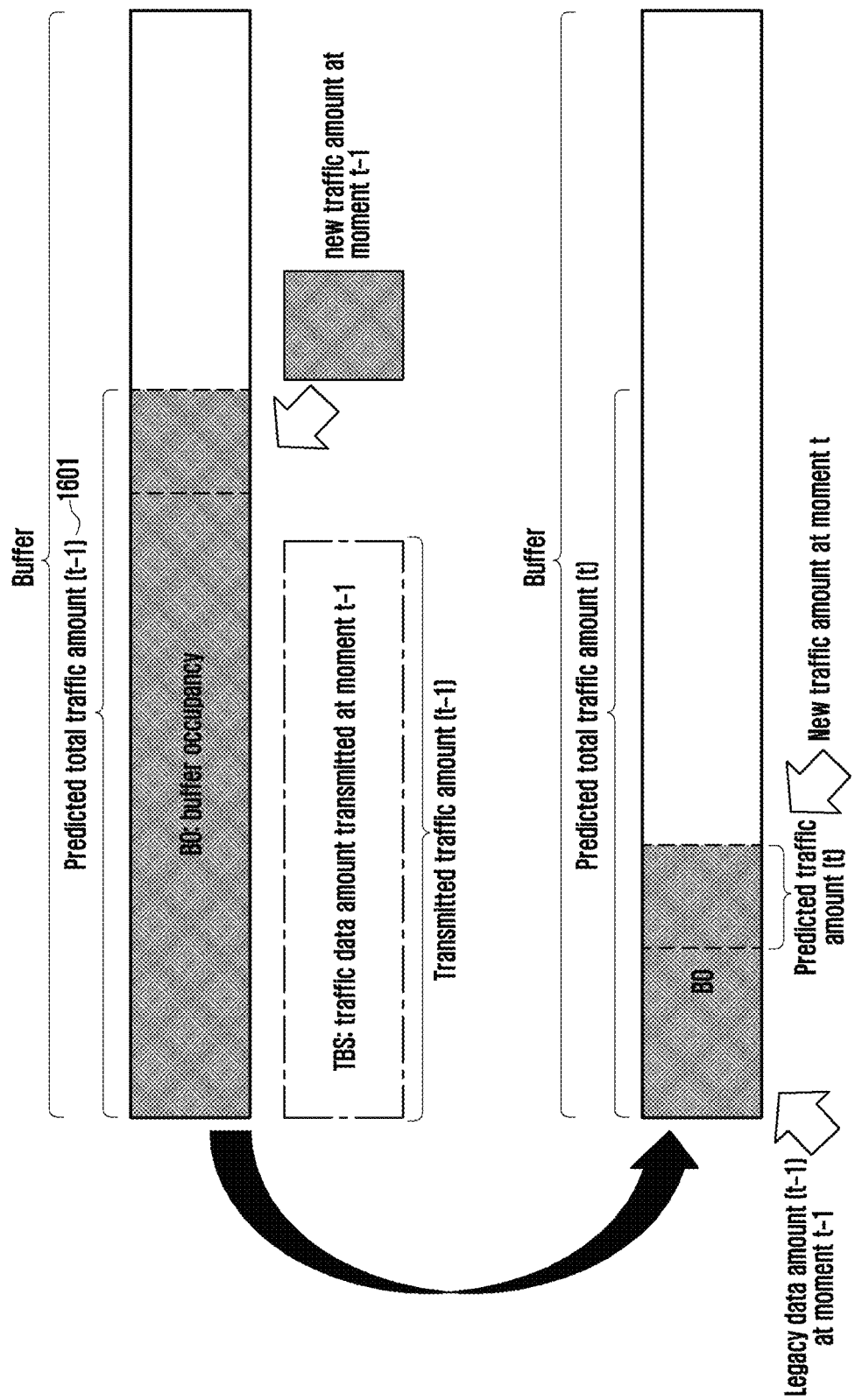
FIG. 16 illustrates aspects of determining the total data amount of each time slot in the next period according to some embodiments of the present application.

As an example, as shown by the illustrative example of FIG. 16, tin the figure represents the tth slot in the next period, and the total traffic amount (t−1) 1601 of the (t−1)th slot (BO shown in the figure: Buffer Occupancy) includes the legacy data amount before the slot and the new traffic data amount at moment t−1 (the new traffic amount at moment t−1 shown in the figure), and the legacy data amount of the slot can be obtained by subtracting the total traffic amount (t−1) of the slot from the data amount actually transmitted in the slot (TBS shown in the figure: the data amount transmitted at moment t−1/the data amount transmitted). The total data amount (t) of the moment t can be obtained by adding the legacy data amount (the legacy data amount (t−1) at moment t-lshown in the figure) and the new traffic data amount in the tth slot (the predicted traffic amount (t) and the new traffic amount at moment t shown in the figure).

2) Using the AI algorithm to select the optimal allocation solution, that is, the target allocation solution (corresponding to the step of generating all possible resource allocation candidate solutions to output shown in FIG. 14)

First, based on the predicted LTE data amount and NR traffic data amount, a complete set of all possible LTE-NR resource allocation solutions can be obtained. Specifically, in this example, the resource allocation granularity corresponds to a single resource block (RB). The total number of RBs on the full bandwidth in the next prediction period can be determined first. For example, the next period includes 10 time slots, that is, time TTI, and each TTI corresponds to 10 RBs. The total spectrum resource is 10 TTIs×100 RBs=1000 RBs, and then these 1000 RBs are allocated to each traffic of each UE on each TTI to obtain all possible resource allocation candidate solutions.

Wherein, after predicting the data amount required for resource allocation in each time unit of a period, all possible resource allocations in the period (such as all possible candidate allocation solutions for LTE systems and NR systems) can be generated, and then while generating the allocation solution, during initialization, the initial value of the resources that need to be allocated on each time unit of each RAT system can be set. For example, the initial value can be set to "0", and then iteratively calculation is performed on the resource amount that need to be allocated on each time unit through a pre-configured allocation solution determination algorithm to obtain the final resource allocation amount on each time unit.

After that, some solutions that do not meet the boundary conditions (that is, transmission constraints) are removed, such as delay substandard, rate substandard, etc., and the candidate solutions that meet the boundary conditions are retained, that is, select and retain each candidate spectrum resource allocation solutions that meet the constraints, when the spectrum resource granularity is RB level, the number of candidate spectrum resource allocation solutions that meet the requirements will be larger.

In certain embodiments, the boundary conditions include but are not limited to one or more of the following:

Meeting the QoS requirements of specific traffics (such as delay requirements, transmission rate requirements, etc.);

Meeting the requirements of resource constraints (because the total bandwidth resources are limited, the allocated resources cannot exceed the resource amount requirement);

Allocating resources at the starting point in the next period, that is, allocating resources at each time unit in the period in period units; and Allocating the frequency domain resources on the entire bandwidth, that is, resource allocation is performed on all available frequency domain resources of the above RAT systems. The allocation granularity of the resources is not limited in the embodiment of the application, and may be, for example, an RB.

In order to select the target allocation solution from the candidate spectrum resource allocation solutions that meet the conditions, it is possible to select the optimal LTE-NR resource allocation solution by using the AI algorithm in combination with the feedback of the performance indicator. The performance indicator in the embodiment of the present application reflects the difference between the cumulative TBS of each traffic provided by each candidate solution to each UE in the next prediction period and the data amount of each traffic of each UE, and a smaller difference value displayed by the performance indicator means better match the LTE-NR resources allocated by the candidate solution in the next period with the upcoming LTE-NR traffic amount. Wherein, the specific choice of the AI algorithm is not limited in this embodiment of the present application, for example, a GD (gradient descent) algorithm can be selected.

According to various embodiments, the following P function may be used to select the target allocation solution. The P function is the objective function. Based on the objective function, the optimal target allocation solution is selected from the candidate spectrum resource allocation solutions based on the objective function.

$$P = \text{argmin}\left(\sum_{m=1}^{M} \overbrace{5GBO_m + 5GBO'_m - 5GTBS_m}^{\text{each service of 5G user}} + \sum_{n=1}^{N} \overbrace{4GBO_n + 4GBO'_n - 4GTBS_n}^{\text{each service of 4G user}}\right)$$

The basic elements in the function formula are:

Basic element=$(XGBO_i+XGBO'_i-XGTBOS_i)$, wherein $X$=4 or 5, and $i=m$ or $n$

Wherein, M represents the product of the number of 5G users and the number of 5G traffic types, and N is the product of the number of 4G users and the number of 4G traffic types. In this alternative embodiment, resource allocation is performed in units of each slot. Taking X=4, n=5 as an example, $XGBO_i$ represents the legacy data amount in the previous slot of a certain slot corresponding to a certain traffic of a 4G user in 4G, and $XGBO'_i$ represents the new traffic data amount corresponding to a certain slot, $XGTBOS_i$ represents the traffic bear amount corresponding to spectrum resources allocated for the total traffic amount $XGBO_i+XGBO'_i$ of the slot in a certain candidate spectrum resource allocation solution.

The above basic elements represent the difference between the data amount that a certain traffic needs to transmit and the data amount that can be carried by the allocated spectrum resources in the next prediction period. In order to maximize the effectiveness of the DSS (Dynamic Spectrum Sharing) resource allocation solution, the basic elements of each traffic should be as small as possible, such that the sum of the basic elements of each traffic is the minimum, that is, the P value is the minimum. Therefore, the above P function can be used as the objective function, and the AI algorithm can quickly select the solution with the minimum P value from the candidate spectrum resource allocation solutions, and this selected solution is the target allocation solution.

Figure 17:
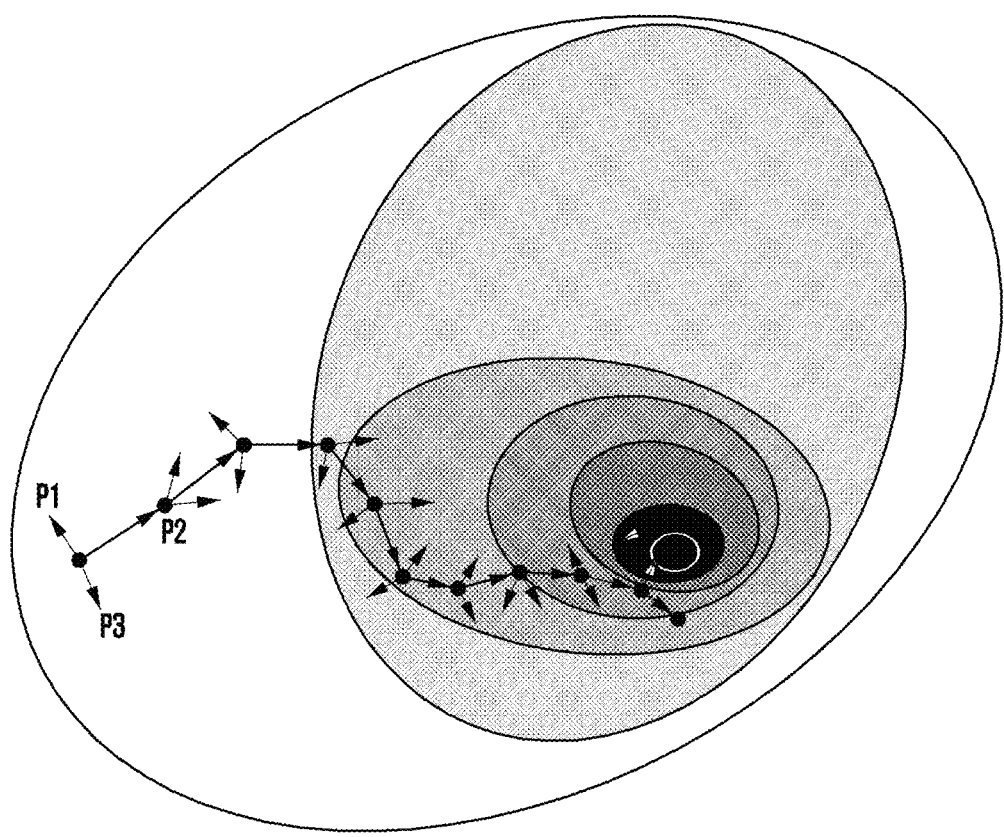
FIG. 17 illustrates aspects of an example gradient descent algorithm according to some embodiments of this disclosure.

FIG. 17 illustrates aspects of screening out the target allocation solution through the GD algorithm according to various embodiments of this disclosure. The GD algorithm can find a local minimum value in each iteration. For example, in one iteration, the GD algorithm randomly selects three candidate solutions and calculate the above P value (the P values corresponding to the three solutions are respectively marked as P1, P2, P3), and then find the two candidate solutions (max{(P1-P2, P1-P3, P2-P3}) with the largest difference in P values, and further find the convergence direction A for obtaining the minimum P value candidate solution and finally find the optimal candidate solution through continuous iterative selection.

Step 5 (transmission 265 in FIG. 2): The eNB transmits the shared spectrum resource information to the gNB.

After the resource allocation solution for each 4G and 5G user corresponding to each traffic on each slot is determined at block 263 (that is, TTI) in the next period, the eNB will transmit the spectrum resource information shared on each TTI in the next period in the specified format, and the gNB can read in the specified format after receiving it.

Optionally, the spectrum resource information content transmitted by the eNB to the gNB includes but is not limited to:

the total number of RBs that can be used by the gNB in the first TTI starting in the next period, followed by the sequence number of each available RB. Then start the reading of the total number of RBs and the RB sequence number of the next TTI.

Figure 18:
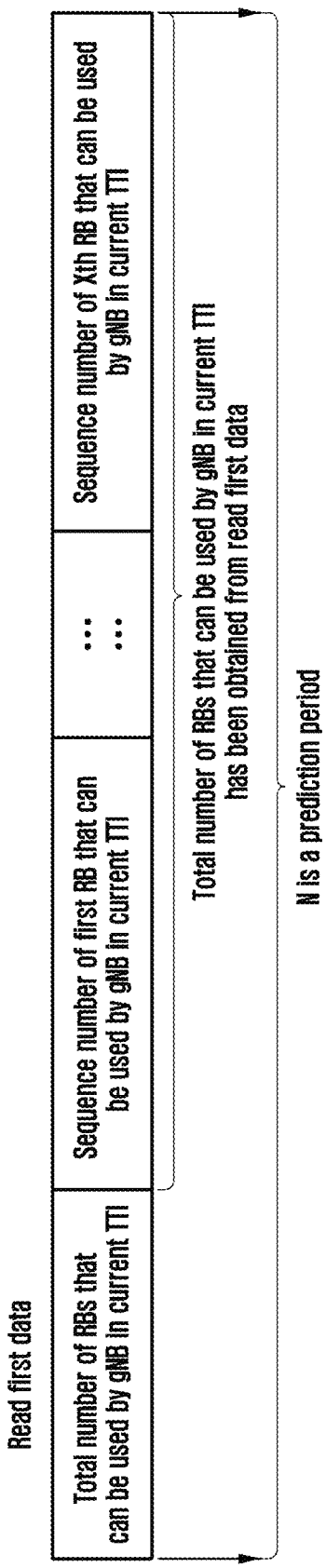
FIG. 18 illustrates an example of a data format and data content when transmitting spectrum resource information provided in an example of the present application.
Figure 19:
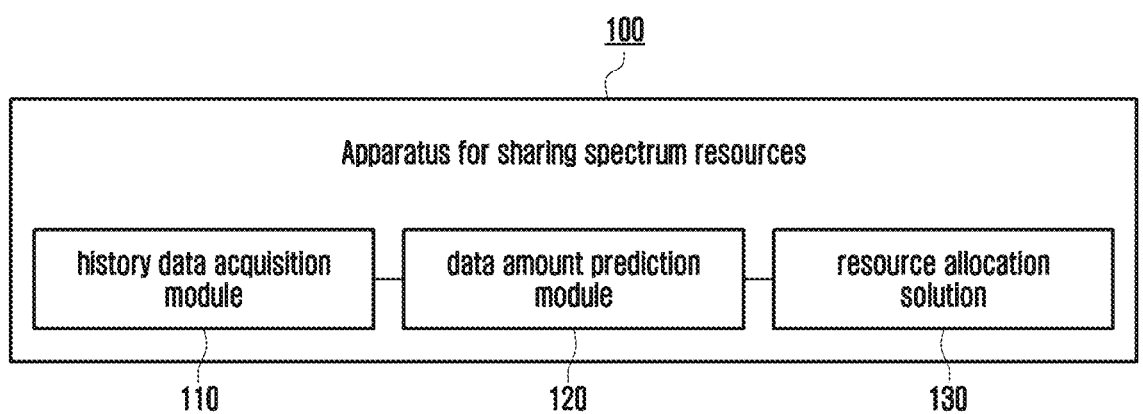
FIG. 19 illustrates, in block diagram format, an example of an apparatus for sharing spectrum resources according to various embodiments of the present application.

As an example, FIG. 18 illustrates an example of a data transmission format and data content of spectrum resource information according to various embodiments of this disclosure. As shown in the non-limiting example of FIG. 18, for one TTI, the first data in the format is the total number of RBs that can be used by the gNB in the current TTI, the following data can be the sequence number of the first RB, the sequence number of the second RB, . . . , the sequence number of the Xth RB that can be used by the gNB in the current TTI.

According to various embodiments, at Step 6 (block 267 in FIG. 2) the eNB and gNB perform data transmission for 4G traffic and 5G traffic respectively on their respective spectrum resources, that is, eNB uses allocated spectrum resources for 4G traffic data transmission, and gNB uses the acquired shared spectrum resources for 5G traffic data transmission.

In various embodiments according to the present application, the data amount corresponding to each traffic for each user on each slot in the next period can be predicted based on history traffic data, and the RB-level spectrum resources corresponding to each traffic for each user on the slot can be determined based on the number and the total spectrum resources. Based on this solution, the maximum reasonable allocation of spectrum resources is realized, which can not only reduce resource waste, but also reduce traffic delay and ensure traffic data transmission rate and can greatly improve the user's traffic perception.

The inventors of the present application conducted simulation tests on the solutions provided by the embodiments of the present application. The test results show that compared with the existing spectrum resource sharing solutions, the error ratio, average error ratio, and error variance of the solutions of the embodiments of the present application are all significantly reduced. Wherein, the error ratio is used to evaluate the accuracy of the resource allocation solution, that is, the matching degree between the allocated LTE-NR resources and the upcoming transiently changing LTE-NR traffic data amount, and the larger the error ratio is, the lower the matching degree is, the smaller the error ratio is, the higher the matching degree is. The average error ratio represents the average of the matching degree between the allocated resources and the total traffic data amount during the evaluation time, and the error variance represents the matching degree between the allocated resources and the traffic data amount during the evaluation time with the fluctuation of the TTI. The simulation results show that based on the spectrum resource allocation solution determined based on the solution provided in the present application, the allocated resources are effectively the same as the resources allocated by the ideal technical solution, while the resources allocated by the existing technical solution are quite different from the resources allocated by the ideal technical solution.

In addition, based on the solutions provided by the embodiments of the present application, when the spectrum resource sharing of different communication systems is realized and the first RAT system shares the spectrum resources with the second RAT system, there is no need to switch a resource control switch corresponding to the spectrum resources of the shared part. It is only necessary that the first RAT system does not use this part of the shared resources, which avoids the time delay caused by the switch.

Certain embodiments according to the present application apparatus for sharing spectrum resources, such as described with reference to FIGS. 1 and 2 of this disclosure. Referring to the non-limiting example of FIG. 19, a device 100 for sharing spectrum resources may include a history data acquisition module 110, data amount prediction module 120 and resource allocation module 130.

The history data acquisition module 110 is configured to acquire first history traffic data of a first RAT system and second history traffic data of a second RAT system, wherein, for any of the first history traffic data and the second history traffic data, includes the data amount to be transmitted in at least one history period.

The data amount prediction module 120 is configured to determine the first new traffic data amount of the first RAT system and the second new traffic data of the second RAT system in the next period according to the first history traffic data and the second history traffic data the amount.

The resource allocation module 130 is configured to determine a first new traffic data amount of the first RAT system and the second RAT system and a second new traffic data amount of the second RAT system in the next period according to the first history traffic data and the second history traffic data.

In certain embodiments, the data amount prediction module 120 may also be configured to determine time-invariant traffic data features and first time-varying traffic data features corresponding to the history traffic data according to the first history traffic data and the second history traffic data, predict a second time-varying traffic data feature in the next period according to the first time-varying traffic data feature, and determine the first new traffic data amount of the first RAT system and the second new traffic data amount of the second RAT system in the next prediction period according to the time-invariant traffic data feature and the second time-varying traffic data feature.

In some embodiments, when the data amount prediction module 120 determines the time-invariant traffic data features and the first time-varying traffic data features corresponding to the history traffic data according to the first history traffic data and the second history traffic data, it may be configured to generate a history traffic data matrix according to the first history traffic data and the second history traffic data, and obtain the time-invariant traffic data feature matrix and the first time-varying traffic data feature matrix corresponding to the history traffic data according to the history traffic data matrix. In certain embodiments, an element value of the time-invariant traffic data matrix represents the feature value of the data amount to be transmitted that is independent of time among the data amount to be transmitted in at least one history period of the first RAT system or the second RAT system; an element value of the time-varying traffic data matrix represents a feature value of the data amount to be transmitted related to time in the data amount to be transmitted in at least one history period of the first RAT system or the second RAT system.

Correspondingly, the data amount prediction module 120, when predicting the second time-varying traffic data feature in the next period according to the first time-varying traffic data feature, may be configured to predict the second time-varying traffic data feature matrix in the next period according to the first time-varying traffic data feature matrix.

The data amount prediction module 120, when determining the first new traffic data amount of the first RAT system and the second new traffic data of the second RAT system in the next prediction period according to the time-invariant traffic data features and the second time-varying traffic data features, may be configured to obtain the first new traffic data amount and the second new traffic data amount according to the time-invariant traffic data feature matrix and the second time-varying traffic data feature matrix.

In certain embodiments, a period includes at least one time unit, and the data amount to be transmitted in at least one history period includes the data amount to be transmitted corresponding to each time unit in at least one history period, the first new traffic data amount and the second new traffic data amount includes the new traffic data amount corresponding to each time unit in the next period.

In some embodiments, the resource allocation module 130 may be configured to determine the spectrum resources corresponding to each time unit of the first RAT system and the second RAT system in the next period according to the first new traffic data amount and the second new traffic data amount.

Additionally, any history traffic data further may include the actually transmitted data amount of at least one history period. For any of the first RAT system and the second RAT system, the data amount prediction module 120 may be further configured to determine a history legacy data amount of the system according to the data amount to be transmitted and the actually transmitted data amount in the history traffic data of the system.

In various embodiments, the resource allocation module 130, when determining the spectrum resources corresponding to the first RAT system and the second RAT system in the next period according to the first new traffic data amount and the second new traffic data amount, may be configured to determine the first total data amount of the first RAT system in the next period according to the first new traffic data amount and the history legacy data amount of the first RAT system, determine the second total data amount of the second RAT system in the next period according to the second new traffic data amount and the history legacy data amount of the second RAT system, and determine the spectrum resources respectively corresponding to the first RAT system and the second RAT system in the next period according to the first total data amount and the second total data amount.

In certain embodiments, a period includes at least one time unit, the data amount to be transmitted in at least one history period includes the data amount to be transmitted corresponding to each time unit in at least one history period, the first new traffic data amount and the second new traffic data amount includes the new traffic data amount corresponding to each time unit in the next period.

For any one of the first RAT system and the second RAT system, the resource allocation module 130 may be configured to, for any time unit in the next period, determine the total data amount of the time unit based on the new traffic data amount corresponding to the time unit and the legacy data amount of the previous time unit of the time unit, such that the legacy data amount of the previous time unit of the first time unit in the next period is the history legacy data amount.

Correspondingly, the resource allocation module 130, when determining the spectrum resources corresponding to the first RAT system and the second RAT system in the next period according to the first total data amount and the second total data amount, may be configured to, for any time unit in the next period, based on the first total data amount of the first RAT system and the second total data amount of the second RAT system corresponding to the time unit, determine the spectrum resources of the first RAT system and the second RAT system corresponding to the time unit respectively.

In certain embodiments, history traffic data includes the data amount to be transmitted corresponding to each traffic type in at least one history period, and the first new traffic data amount and the second new traffic data amount include the new traffic data amount corresponding to each traffic type in the next period.

In some embodiments, the resource allocation module 130 may be configured to determine the spectrum resources corresponding to each traffic type of the first RAT system and each traffic type of the second RAT system in the next period according to the first new traffic data amount and the second new traffic data amount.

History traffic data can include the data amount to be transmitted corresponding to each user in at least one history period, and the first new traffic data amount and the second new traffic data amount include the new traffic data amount corresponding to each user in the next period.

Correspondingly, the resource allocation module 130 may be configured to determine the spectrum resources corresponding to each user of the first RAT system and each user of the second RAT system in the next period according to the first new traffic data amount and the second new traffic data amount.

In various embodiments, the resource allocation module 130, when determining the spectrum resources corresponding to the first RAT system and the second RAT system in the next period respectively according to the first total data amount and the second total data amount, may be configured to determine each candidate spectrum resource allocation solution corresponding to the first RAT system and the second RAT system according to the first total data amount, the second total data amount, and the total spectrum resources. Resource allocation module 130 may be further configured to determine the target allocation solution of the first RAT system and the second RAT system according to each candidate spectrum resource allocation solution.

In some embodiments, the resource allocation module 130 may be configured to select candidate solutions that meet the conditions from the candidate spectrum resource allocation solutions according to traffic data transmission constraint conditions, and determine the target allocation solution from the selected candidate solutions.

The resource allocation module 130, when determining the target allocation solution of the first RAT system and the second RAT system according to each candidate spectrum resource allocation solution, may be configured to determine the target allocation solution according to the first total data amount, the second total data amount, the data amount carried by the spectrum resources corresponding to the first total data amount in each candidate spectrum resource allocation solution, and the data amount carried by the spectrum resources corresponding to the second total data amount.

In some embodiments, when determining the target allocation solution according to the first total data amount, the second total data amount, the carried data amount of the spectrum resources corresponding to the first total data amount in each candidate spectrum resource allocation solution, and the carried data amount of the spectrum resources corresponding to the second total data amount, the resource allocation module 130 may be configured to determine the corresponding allocation solution with the minimum difference in the traffic data amount among the candidate spectrum resource allocation solutions as the target allocation solution.

In some embodiments, the difference in the traffic data amount is the sum of the first difference and the second difference. For any candidate spectrum resource allocation solution, the first difference is the difference between the first total data amount and the data amount carried by the spectrum resources corresponding to the first RAT system in the candidate spectrum resource allocation solution, and the second difference is the difference between the second total data amount and the data amount carried by the spectrum resources corresponding to the second RAT system in the candidate spectrum resource allocation solution.

In the above-described illustrative embodiments, two RAT systems are taken as an example to illustrate the principles of various implementations of methods for sharing spectrum resources provided in the present application. It is understandable that the method provided in the embodiment of the present application can also be applied to the allocation of spectrum resources of two or more RAT systems, that is, the method is applicable to the spectrum resource sharing between two or more RAT systems, that is the allocation of spectrum resources for each RAT system according to the total spectrum resources of a period.

The following describes various embodiments of a method for sharing spectrum resources provided by the present application from another perspective. It is understandable that the descriptions in the following optional embodiments can be referred to the corresponding descriptions in the preceding optional implementations using two RAT systems as examples.

Figure 20:
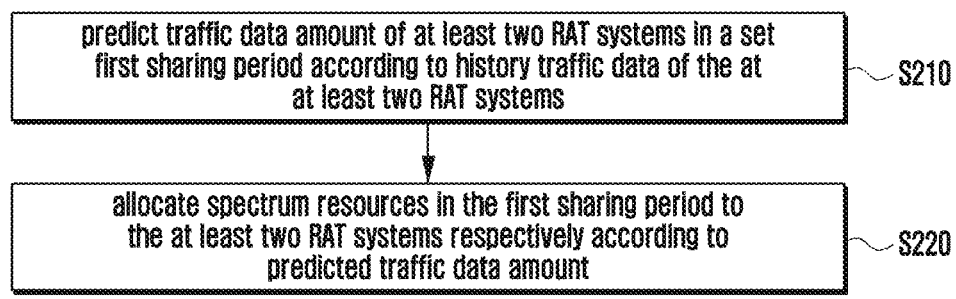
FIG. 20 illustrates operations of an example method for sharing spectrum resources according to various embodiments of the present application.

FIG. 20 illustrates operations of an example method for sharing spectrum resource provided by some embodiments of the present application. As shown in the figure, at Step S210: the method comprises predicting the traffic data amount of the at least two RAT systems in the set first sharing period according to the history traffic data of the at least two RAT systems.

According to some embodiments, at Step S220 the spectrum resources in the first sharing period to the at least two RAT systems are allocated according to the predicted traffic data amount.

In the explanatory example of FIG. 20, a first sharing period is a time unit, and the specific duration of the first sharing period is not limited in this embodiment of the present application. The traffic data amount in this embodiment refers to the total traffic data amount in a first sharing period (including the new data amount in the first sharing period and the legacy data amount in the previous sharing period).

In certain embodiments, it is possible to predict the traffic data amount of the first sharing period of the multiple RAT systems based on the history traffic data of the multiple RAT systems and perform spectrum resource allocation for each RAT system based on the predicted traffic data amount. As used in this example, the expression traffic data amount refers to the total traffic data amount.

The above at least two RAT systems can include a fourth-generation mobile communication system, that is, 4G (also may be referred to as a 4G system) and a 5G system.

In some embodiments, the above history traffic data may include at least one of the following:
user identifier corresponding to traffic data;
Quality of Service class identifier corresponding to traffic data;

logical channel group identifier corresponding to traffic data;

traffic data amount to be transmitted in at least one history first sharing period; and actually transmitted traffic data amount of at least one history first sharing period.

In some embodiments according to the present application, at step S220, according to the predicted traffic data amount, allocating spectrum resources in the first sharing period to at least two RAT systems according to the predicted traffic data amount, may include:

determining at least one candidate transmission data amount of each traffic data category in the first sharing period according to the predicted traffic data amount;

determining the target candidate transmission data amount corresponding to each traffic data category according to the candidate transmission data amount corresponding to each traffic data category;

allocating spectrum resources for each traffic data category according to the target candidate transmission data amount corresponding to each traffic data category respectively.

In some embodiments, the traffic data categories described above are classified according to at least one of the following:

User, traffic type, and RAT system.

In other words, the data amount corresponding to each first sharing period (such as the candidate transmission data amount, the legacy data amount, etc.) can be classified according to one or more of the user, traffic type, and RAT system, that is, the classification granularity of the data amount described in the previous embodiment can be classified in different ways according to requirements. For example, the data amount corresponding to a traffic data category can be a data amount corresponding to a traffic type of a user in a RAT system.

As used herein, the expression least one candidate transmission data amount of a traffic data category refers to the data amount which can be transmitted by the candidate allocated resources (may be the resources allocated to the category, that is, the candidate spectrum resource allocation solution corresponding to the traffic data category) corresponding to the traffic data category, that is, the data amount that a candidate allocated resource can carry, and the data amount that a candidate allocated resource can actually transmit is a kind of candidate transmission data amount. Correspondingly, the target candidate transmission data amount is a target data amount determined from various candidate transmission data amounts of the traffic data category, that is, the data amount that can be carried by the resources allocated for the traffic data category. It corresponds to the data amount that can be carried by the target allocation solution of the traffic data category in the above optional embodiment.

In various embodiments, determining the target candidate transmission data amount corresponding to each traffic data category according to the candidate transmission data amount corresponding to each traffic data category, includes determining each legacy data amount corresponding to each candidate transmission data amount combination in the first sharing period according to each candidate transmission data amount combination corresponding to each traffic data category, wherein each candidate transmission data amount combination includes one candidate transmission data amount corresponding to each traffic data category, and determining the target candidate transmission data amount corresponding to each traffic data category according to each legacy data amount corresponding to each candidate transmission data amount combination respectively.

The candidate transmission data amounts corresponding to all traffic data categories can be combined, and each combination contains a candidate transmission data amount corresponding to each traffic data category. For a combination, the candidate transmission data amount of the combination is also the sum of the candidate transmission data amount of each traffic data category contained in the combination. For each combination, by determining the legacy data amount corresponding to each combination, the target combination is determined from each combination, and the candidate transmission data amount of each traffic data category contained in the target combination is determined as the target candidate transmission data amount of each traffic data category.

In some embodiments, determining each candidate legacy data amount corresponding to each candidate transmission data amount combination in the first sharing period according to the candidate transmission data amount of each candidate transmission data amount combination corresponding to each traffic data category, includes for any candidate transmission data amount combination, determining the difference between the predicted traffic data amount and the candidate transmission data amount of the combination as the legacy data amount corresponding to the combination.

For a first sharing period, the legacy data amount corresponding to a combination is the difference between the predicted traffic data amount of the period and the candidate transmission data amount (the data amount that can be transmitted) of the combination.

Determining the target candidate transmission data amount corresponding to each traffic data category according to each candidate legacy data amount corresponding to each candidate transmission data amount combination, may include determining the candidate transmission data amount of each traffic data category corresponding to the candidate transmission data amount corresponding to the minimum legacy data amount as the target transmission data amount of each traffic data category.

The minimum legacy data amount is the difference between the data amount that can be transmitted by the allocated frequency domain resources and the predicted data amount is the minimum. Based on this solution, resource utilization can be improved as much as possible. This solution corresponds to the following expression in the implementation described above:

$$P = \mathrm{argmin}\left(\sum_{m=1}^{m} \overline{\frac{\text{each service of 5G user}}{5GBO_m + 5GBO'_m - 5GTBS_m}} + \sum_{n=1}^{N} \overline{\frac{\text{each service of 4G user}}{4GBO_n + 4GBO'_n - 4GTBS_n}}\right).$$

This expression is described by using two RAT systems (4G and 5G systems) as an example and can also be extended to the resource allocation of more than two RAT systems. In this expression, M and N respectively represent the category data of the traffic data category in the 5G system and the traffic data category in the 4G system. $5GB0_m + 5GB0'_m$ represents the predicted traffic data amount of the mth traffic data category of the 5G system, $5GTBS_m$ represents the candidate transmission data amount corresponding to the mth traffic data category of the 5G system, the sum of the first item (the first summation item) and the second item represents the legacy data amount corresponding to a certain candidate transmission data amount combination corresponding to the 4G system and the 5G system. This expression is to find the candidate transmission data combination with the minimum P value, that is, to find the candidate transmission data combination with the minimum data amount. The candidate transmission data amount of each traffic data category corresponding to this combination is the target candidate transmission data amount corresponding to each traffic data category.

In an embodiment of the present application, determining at least one candidate transmission data amount of each traffic data category in the first sharing period, includes determining at least one candidate transmission data amount of each traffic data category in the first sharing period according to at least one of the following:

a resource amount corresponding to the total transmission data amount of each traffic data category in the first sharing period is less than a first threshold; and a transmission delay of the legacy data amount in the last first sharing period is less than a second threshold.

The above resource amount refers to the number of resources of frequency domain resources required to transmit the above total transmission data amount, and the total transmission data amount of each traffic data category refers to the sum of the candidate transmission data amounts contained in each combination. Resource granularity corresponding to the resource amount is not limited in the embodiment of the present application, for example, it may be the total number of RBs. The specific values of the first threshold and the second threshold may be configured according to actual needs or empirical values. In some embodiments, the first threshold can be a threshold not greater than the total traffic data amount (predicted total traffic data amount) of each traffic data category, or the difference between the first threshold and the predicted total traffic data amount of each traffic data category is within a certain range, the first threshold may be greater than the predicted total traffic data amount or may be less than the predicted total traffic data amount. The second threshold may be the maximum transmission delay of the legacy data amount.

Based on the above, when determining the candidate transmission data amount corresponding to each traffic category, the first item above can ensure the effective utilization of resources, and avoid resource waste on the premise of ensuring balanced resource allocation and meeting the amount of resources required for the data amount to be transmitted, and the second item can ensure the delay requirements of the data to be transmitted, that is, when determining the candidate resource allocation, the delay requirements and transmission rate requirements of the data to be transmitted can be determined.

In an embodiment of the present application, predicting the traffic data amount of the at least two RAT systems in the set first sharing period based on the history traffic data of the at least two RAT systems, includes determining the new traffic data amount of the at least two RAT systems in the set first sharing period according to the history traffic data of the at least two RAT systems, determining the legacy data amount of the previous first sharing period, determining the total traffic data amount in the set first sharing period according to the new traffic data amount of the at least two RAT systems in the set first sharing period and the legacy data amount of the previous first sharing period.

In an embodiment of the present application, determining the new traffic data amount of the at least two RAT systems in the set first sharing period according to the history traffic data of the at least two RAT systems, includes obtaining history traffic data corresponding to each traffic data category from history traffic data of at least two RAT systems, determining the new traffic data amount of each traffic data category in the set first sharing period according to the history traffic data corresponding to each traffic data category, and determining the new traffic data amount in the set first sharing period according to the new traffic data amount of each traffic data category in the set first sharing period.

In some embodiments determining the new traffic data amount in the set first period according to the new traffic data amount of each traffic data category in the set first sharing period, includes determining the sum of the new traffic data amount of each traffic data category in the set first sharing period as the new traffic data amount of the set first period.

That is, the total traffic data amount of a first sharing period includes the new traffic data amount of the first sharing period and the legacy data amount of the previous first sharing period of the period. For each traffic data category, the new traffic data amount of the traffic data category in the first sharing period can be predicted according to the history traffic data of the traffic data category in the history traffic data. The sum of the new traffic data amount of each traffic data category in the set first sharing period is the new traffic data amount of the period.

In the embodiments provided above, for example, the prediction of the new traffic data amount may be realized through an AI model.

In an embodiment of the present application, determining the new traffic data amount of each traffic data category in the set first sharing period according to history traffic data corresponding to each traffic data category, includes predicting the time-varying traffic data features of each traffic data category in the set first sharing period according to history traffic data corresponding to each traffic data category, and determining the new traffic data amount of each traffic data category in the set first sharing period according to the time-varying traffic data features of each traffic data category in the set first sharing period.

In an embodiment of the present application, predicting the time-varying traffic data features of each traffic data category in the set first sharing period according to history traffic data corresponding to each traffic data category, includes determining the history time-varying traffic data features and history time-invariant traffic data features of each traffic data category according to the history traffic data corresponding to each traffic data category and predicting the time-varying traffic data features of each traffic data category in the set first sharing period according to the history time-varying traffic data features of each traffic data category.

Determining the new traffic data amount of each traffic data category in the set first sharing period according to the time-varying traffic data features of each traffic data category in the set first sharing period, may include determining the new traffic data amount of each traffic data category in the set first sharing period according to the history time-invariant traffic data features of each traffic data category and the time-varying traffic data features of each traffic data category in the set first sharing period.

Wherein, the meaning of the time-varying traffic data features and the time-invariant traffic data features can be referred to the description in the above and will not be repeated here.

In an embodiment of the present application, predicting the time-varying traffic data features of each traffic data category in the set first sharing period according to the history time-varying traffic data features of each traffic data category, includes predicting the time-varying traffic data features of each traffic data category in the second sharing period to which the first sharing period belongs according to the history time-varying traffic data features of each traffic data category.

In an embodiment of the present application, determining the new traffic data amount of each traffic data category in the set first sharing period according to the time-varying traffic data features of each traffic data category in the set first sharing period, includes determining the new traffic data amount of each traffic data category in the second sharing period according to the time-varying traffic data features and the history time-invariant traffic data features of each traffic data category in the second sharing period, and determining the new traffic data amount of each traffic data category in each first sharing period contained in the second sharing period according to the new traffic data amount of each traffic data category in the second sharing period.

In some embodiments, the second sharing period may include one or more first sharing periods, and the first sharing period may correspond to the time unit in the above, and the second sharing period may correspond to one period in the above embodiment. That is, one or more time-varying traffic data of the first sharing period contained in the second sharing period can be determined according to the history traffic data. Specifically, the history time-varying traffic data features and history time-varying traffic data features of each traffic category can be determined based on the history traffic data, and then the time-varying traffic data features of the second sharing period is predicted based on the history time-varying traffic data features, and then the new traffic data amount of each first sharing period contained in the second sharing period is deduced according to predicted the time-varying traffic data features and history time-invariant traffic data features of the second sharing period.

In some embodiments, implementations can obtain the history time-varying traffic data features and history time-invariant traffic data features of each traffic data category through the PCA algorithm based on the history traffic data, and then obtain the time-varying traffic data features of each traffic data category of the second sharing period based on the history time-varying traffic data features of each traffic data category, and then obtain the new traffic data amount of each traffic category in the second sharing period through the inverse PCA algorithm based on the predicted time-varying traffic data features and history time-invariant traffic data features, so as to obtain the new traffic data amount of each traffic data category of each first sharing period within the second sharing period, and for each first sharing period, further obtain the total traffic data amount of the first sharing period based on the new traffic data amount of the first sharing period and the legacy data amount of the previous first sharing period of the period.

The above solutions provided by embodiments according to the present application can determine the spectrum resources corresponding to each traffic data category in the set first sharing period for each RAT system, which realizes the dynamic allocation of spectrum resources, effectively improve resources rate and ensure the balance of resource allocation.

Figure 21:
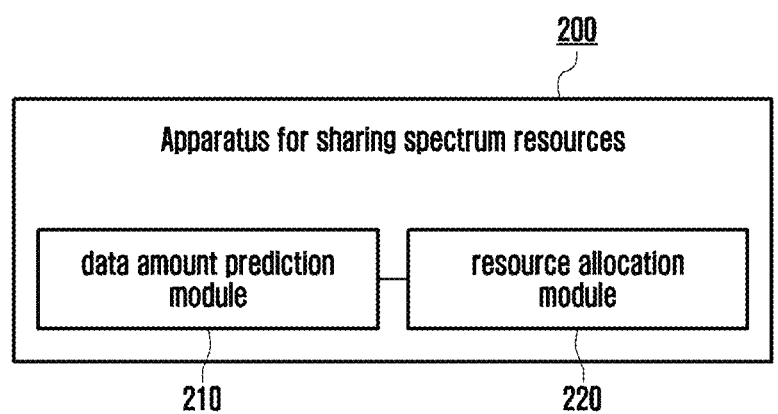
FIG. 21 illustrates, in block diagram format, an example of an apparatus for sharing spectrum resources according to certain embodiments of the present application.

Some embodiments of the present application also provides an apparatus for sharing spectrum resource corresponding to the method shown in FIG. 20. As shown in FIG. 21, an apparatus for sharing spectrum resources 200 may include a data amount prediction module 210 and a resource allocation module 220.

In this example, data amount prediction module 210 is configured to predict a traffic data amount of at least two RAT systems in to set first sharing period according to history traffic data of the at least two RAT systems and resource allocation module 220 is configured to allocate spectrum resources in the first sharing period to at least two RAT systems according to the predicted traffic data amount.

In certain embodiments, the resource allocation module 220 may be configured to determine at least one candidate transmission data amount of each traffic data category in the first sharing period according to the predicted traffic data amount, determine the target candidate transmission data amount corresponding to each traffic data category according to the candidate transmission data amount corresponding to each traffic data category, and allocate spectrum resources for each traffic data category according to the target candidate transmission data amount corresponding to each traffic data category.

In certain embodiments, when the resource allocation module 220 determines the target candidate transmission data amount corresponding to each traffic data category according to the candidate transmission data amount corresponding to each traffic data category, it may be configured to determine each legacy data amount corresponding to each candidate transmission data amount combination in the first sharing period according to the candidate transmission data amount of each candidate transmission data amount combination corresponding to each traffic data category, wherein each candidate transmission data amount combination includes each candidate transmission data amount corresponding to each traffic data category and determine the target candidate transmission data amount corresponding to each traffic data category according to each legacy data amount corresponding to each candidate transmission data amount combination.

The resource allocation module 220, when determining the legacy data amounts corresponding to the candidate transmission data amount combination in the first sharing period according to the candidate transmission data amount of each candidate transmission data amount combination corresponding to each traffic data category, may be configured to for any candidate transmission data amount combination, determine the difference between the predicted traffic data amount and the candidate transmission data amount of the combination as the legacy data amount corresponding to the combination.

In various embodiments, the resource allocation module 220, when determining the target candidate transmission data amount corresponding to each traffic data category according to the candidate legacy data amount corresponding to each candidate transmission data amount combination respectively, may be configured to determine the candidate transmission data amount of each traffic data category corresponding to the candidate transmission data amount with the minimum legacy data amount as the target transmission data amount of each traffic data category.

The resource allocation module 220, when determining at least one candidate transmission data amount of each traffic data category in the first sharing period, may further be configured to determine at least one candidate transmission data amount of each traffic data category in the first sharing period according to at least one of the following:

the number of resources corresponding to the total transmission data amount of each traffic data category in the first sharing period is less than a first threshold; and a transmission delay of the legacy data amount in the last first sharing period is less than a second threshold.

In various embodiments, the data amount prediction module 110 may be configured to determine the new traffic data amount of the at least two RAT systems in the set first sharing period according to the history traffic data of the at least two RAT systems, determine the legacy data amount of the previous first sharing period and determine the total traffic data amount in the set first sharing period according to the new traffic data amount of the at least two RAT systems in the set first sharing period and the legacy data amount of the previous first sharing period.

In certain embodiments, the data amount prediction module 110, when determining the new traffic data amount of the at least two RAT systems in the first sharing period according to the history traffic data of the at least two RAT systems, may be configured to obtain history traffic data corresponding to each traffic data category from the history traffic data of at least two RAT systems, determine the new traffic data amount of each traffic data category in the set first sharing period according to the history traffic data corresponding to each traffic data category, and determine the new traffic data amount in the set first sharing period according to the new traffic data amount of each traffic data category in the set first sharing period.

The data amount prediction module 110, when determining the new traffic data amount in the set first period according to the new traffic data amount of each traffic data category in the set first sharing period, may be configured to determine the sum of the new traffic data amount of each traffic data category in the set first sharing period as the new traffic data amount of the set first period.

In some embodiments, the data amount prediction module 110 when determining the new traffic data amount of each traffic data category in the first sharing period according to the history traffic data corresponding to each traffic data category, may be configured to predict the time-varying traffic data features of each traffic data category in the set first sharing period according to history traffic data corresponding to each traffic data category, determine the new traffic data amount of each traffic data category in the set first sharing period according to the time-varying traffic data features of each traffic data category in the set first sharing period.

In certain embodiments, the data amount prediction module 110, when predicting the time-varying traffic data features of each traffic data category in the first sharing period according to the history traffic data corresponding to each traffic data category, may be configured to determine the history time-varying traffic data features and history time-invariant traffic data features of each traffic data category according to the history traffic data corresponding to each traffic data category, predict the time-varying traffic data features of each traffic data category in the set first sharing period according to the history time-varying traffic data features of each traffic data category.

The data amount prediction module 110, when determining the new traffic data amount of each traffic data category in the set first sharing period according to the time-varying traffic data features of each traffic data category in the set first sharing period, may be configured to determine the new traffic data amount of each traffic data category in the set first sharing period according to the history time-invariant traffic data features of each traffic data category and the time-varying traffic data features of each traffic data category in the set first sharing period.

The data amount prediction module 110, when predicting the time-varying traffic data features of each traffic data category in the set first sharing period according to the history time-varying traffic data features of each traffic data category, may be configured to predict the time-varying traffic data features of each traffic data category in the second sharing period to which the first sharing period belongs according to the history time-varying traffic data features of each traffic data category.

The data amount prediction module 110, when determining the new traffic data amount of each traffic data category in the set first sharing period according to the time-varying traffic data features of each traffic data category in the set first sharing period, may be configured to determine the new traffic data amount of each traffic data category in the second sharing period according to the time-varying traffic data features and history time-invariant traffic data features of each traffic data category in the second sharing period, determine the new traffic data amount of each traffic data category in each first sharing period contained in the second sharing period according to the new traffic data amount of each traffic data category in the second sharing period.

Optionally, the above traffic data categories are classified according to at least one of the following: user, traffic type, and RAT system.

In various embodiments, the history traffic data includes at least one of the following: a user identifier corresponding to the traffic data; a Quality of Service class identifier corresponding to the traffic data; a logical channel group identifier corresponding to the traffic data; an amount of traffic data to be transmitted in at least one history first sharing period; or an actual transmission traffic data amount of at least one history first sharing period.

In some embodiments, the above at least two RAT systems include the fourth-generation mobile communication system (4G) and the fifth-generation mobile communication system (5G).

Based on the same principle, an embodiment of the present application also provides an electronic device, the electronic device includes a memory and a processor, wherein computer programs are stored in the memory, when the computer programs are executed by a processor, the method provided in any optional embodiment of the present application can be implemented.

The embodiment of the present application also provides a computer-readable storage medium in which computer programs are stored, and when the computer programs are executed by a processor, the method provided in any optional embodiment of the present application can be implemented.

Figure 22:
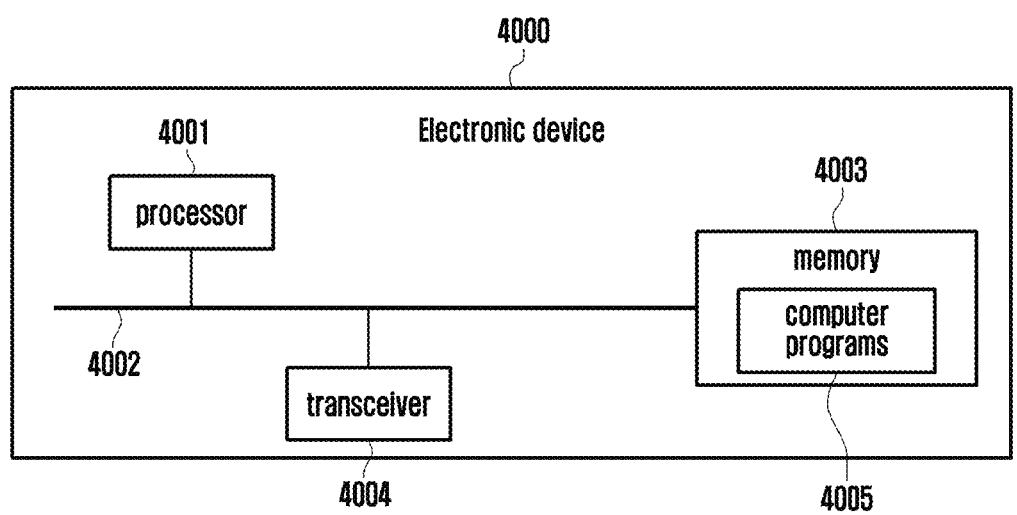
FIG. 22 illustrates, in block diagram format, an example of an electronic device according to various embodiments of the present application.

FIG. 22 illustrates, in block diagram format, an example of an electronic device 4000 to according to some embodiments of this disclosure. As shown in FIG. 22, the electronic device 4000 may include a processor 4001 and a memory 4003. Wherein, the processor 4001 and the memory 4003 are connected, for example, through a bus 4002. Optionally, the electronic device 4000 may further include a transceiver 4004. It should be noted that in actual applications, transceiver 4004 is not limited to a single transceiver (i.e., multiple transceivers are possible and within the contemplated scope of this disclosure), and the structure of the electronic device 4000 does not constitute a limitation to the embodiment of the present application.

The processor 4001 can be a CPU (Central Processing Unit), a general-purpose processor, a DSP (Digital Signal Processor), an ASIC (Application Specific Integrated Circuit), an FPGA (Field Programmable Gate Array) or other programmable logic devices, transistor logic devices, hardware components or any combination thereof. It can implement or execute various exemplary logical blocks, modules and circuits described in conjunction with the disclosure of the present application. The processor 4001 may also be a combination for realizing calculation functions, for example, including a combination of one or more microprocessors, a combination of a DSP and a microprocessor, and so on.

The bus 4002 may include a path for transferring information between the above components. The bus 4002 may be a PCI (Peripheral Component Interconnect) bus or an EISA (Extended Industry Standard Architecture) bus or the like. The bus 4002 can be divided into an address bus, a data bus, and a control bus. For ease of representation, only one thick line is used to represent in FIG. 22, but it does not mean that there is only one bus or one type of bus.

The memory 4003 may be ROM (Read Only Memory) or other types of static storage devices that can store static information and instructions, RAM (Random Access Memory,) or other types of dynamic storage device that can store information and instructions. it can also be EEPROM (Electrically Erasable Programmable Read Only Memory), CD-ROM (Compact Disc Read Only Memory) or other optical disk storage, optical disk storage (including compressed optical discs, laser discs, optical discs, digital universal discs, Blu-ray discs, etc.), magnetic disk storage media or other magnetic storage devices, or any other medium that can be used to carry or store desired program codes in the form of instructions or data structures and can be accessed by the computer, but not limited to this.

The memory 4003 is used to store application program codes for executing the solutions of the present application and is controlled by the processor 4001 to execute. The processor 4001 is configured to execute application program codes (computer programs) stored in the memory 4003 to implement the content shown in any of the above method embodiments.

In the embodiment provided in the present application, the method for generating the above information executed by the electronic device may be executed using an artificial intelligence model.

According to various embodiments, memory 4003 can store instructions (for example, programs 4005), which when executed by processor 4001, cause electronic device 4000 to obtain the traffic data corresponding to the next period by using history traffic data or time-varying traffic data in history traffic data as input data of the artificial intelligence model. Artificial intelligence models can be obtained through training. Here, "obtained through training" means training a basic artificial intelligence model with multiple pieces of training data through a training algorithm to obtain a predefined operating rule or artificial intelligence model configured to perform desired features (or goals). The artificial intelligence model can include multiple neural network layers. Each of the multiple neural network layers includes multiple weight values, and the neural network calculation is performed by calculation between the calculation result of the previous layer and the multiple weight values.

In some embodiments provided in the present application, at least one of the multiple modules can be implemented through an AI model. The functions associated with AI can be performed by non-volatile memory, volatile memory, and a processor.

The processor may include one or more processors. At this time, the one or more processors may be general-purpose processors (for example, central processing unit (CPU), application processor (AP), etc.), or pure graphics processing units (for example, graphics processing unit (GPU), Visual processing unit (VPU), and/or AI dedicated processor (for example, neural processing unit (NPU)).

The one or more processors control the processing of input data according to predefined operating rules or artificial intelligence (AI) models stored in the non-volatile memory and volatile memory. The predefined operating rules or artificial intelligence models can be provided through training or learning.

Here, providing by learning refers to obtaining predefined operating rules or AI models with desired features by applying a learning algorithm to multiple learning data. This learning may be performed in the device itself in which the AI according to the embodiment is executed, and/or may be realized by a separate server/system.

The AI model can consist of multiple neural network layers. Each layer has multiple weight values, and the calculation of one layer is performed by the calculation result of the previous layer and multiple weights of the current layer. Examples of neural networks include, but are not limited to, convolutional neural networks (CNN), deep neural networks (DNN), recurrent neural networks (RNN), restricted Boltzmann machines (RBM), deep belief networks (DBN), bidirectional loops Deep Neural Network (BRDNN), Generative Adversarial Network (GAN), and Deep Q Network.

A learning algorithm is a method of training a predetermined target device (for example, a robot) using multiple learning data to make, allow, or control the target device to make determination or prediction. Examples of the learning algorithm include, but are not limited to, supervised learning, unsupervised learning, semi-supervised learning, or reinforcement learning.

It should be understood that although the various steps in the flowchart of the drawings are shown in sequence as indicated by the arrows, these steps are not necessarily executed in sequence in the order indicated by the arrows. Unless explicitly stated in this article, there is no strict order for the execution of these steps, and they can be executed in other orders. Moreover, at least part of the steps in the flowchart of the drawings may include multiple sub-steps or multiple stages. These sub-steps or stages are not necessarily executed at the same time, but can be executed at different times, and the order of execution is also not necessarily performed sequentially but may be performed alternately or alternately with at least a part of other steps or sub-steps or stages of other steps.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an electronic device for sharing spectrum resources, comprising:
    obtaining at least one time-variant feature and at least one time-invariant feature from history traffic data of at least two radio access technology (RAT) systems;

obtaining a predicted traffic data amount of the at least two RAT systems in a sharing period based on a prediction result of the at least one time-variant feature using an artificial intelligence (AI) model and the at least one time-invariant feature; and performing a resource allocation for the at least two RAT systems in the sharing period based on the predicted traffic data amount of the at least two RAT systems, wherein the predicted traffic data amount comprises a first predicted data amount of a first RAT system of the at least two RAT systems in the sharing period and a second predicted data amount of a second RAT system of the at least two RAT systems in the sharing period, and wherein the predicted traffic data amount of the at least two RAT systems is obtained based on a principal component analysis (PCA) algorithm.

2. The method of claim 1, wherein the performing of the resource allocation comprises:
 determining at least one candidate transmission data amount in the sharing period according to the predicted traffic data amount of the at least two RAT systems;
 determining a target candidate transmission data amount according to the at least one candidate transmission data amount; and
 allocating spectrum resources according to the target candidate transmission data amount.

3. The method of claim 2, wherein the determining of the target candidate transmission data amount, comprises:
 determining a legacy data amount corresponding to each candidate transmission data amount combination in the sharing period, wherein each candidate transmission data amount combination includes one candidate transmission data amount corresponding to each traffic data category; and
 determining, according to the legacy data amount corresponding to each candidate transmission data amount combination, the target candidate transmission data amount.

4. The method of claim 3, wherein the determining of the legacy data amount corresponding to each candidate transmission data amount combination in the sharing period, comprises:
 for a candidate transmission data amount combination, determining a difference between the predicted traffic data amount and the candidate transmission data amount combination.

5. The method of claim 4, wherein the determining of the target candidate transmission data amount comprises:
 determining, based on the candidate transmission data amount combination corresponding to a minimum legacy data amount, as the target candidate transmission data amount.

6. The method of claim 2, wherein the determining of the at least one candidate transmission data amount in the sharing period comprises:
 determining at least one of:
  a number of resources corresponding to a total transmission data amount of each traffic data category in the sharing period being less than a first threshold, or
  a transmission delay of a legacy data amount in a previous sharing period being less than a second threshold.

7. The method of claim 1, wherein the obtaining of the predicted traffic data amount of the at least two RAT systems in the sharing period comprises:

determining a new traffic data amount of the at least two RAT systems in the sharing period based on the prediction result and the at least one time-invariant feature;
determining a legacy data amount of a previous sharing period; and
determining the first predicted data amount and the second predicted data amount in the sharing period according to the new traffic data amount of the at least two RAT systems in the sharing period and the legacy data amount of the previous sharing period.

8. The method of claim 7, further comprising:
 obtaining the history traffic data corresponding to each traffic data category from the history traffic data of the at least two RAT systems;
 determining a new traffic data amount of each traffic data category in the sharing period according to the history traffic data corresponding to each traffic data category; and
 determining the new traffic data amount in the sharing period according to the new traffic data amount of each traffic data category in the sharing period.

9. The method of claim 8, wherein the determining of the new traffic data amount in the sharing period comprises:
 determining a sum of the new traffic data amount of each traffic data category in the sharing period as the new traffic data amount of the sharing period.

10. The method of claim 8, wherein the determining of the new traffic data amount of each traffic data category, comprises:
 predicting time-varying traffic data features of each traffic data category in the sharing period according to the history traffic data corresponding to each traffic data category; and
 determining the new traffic data amount of each traffic data category in the sharing period according to the time-varying traffic data features of each traffic data category in the sharing period.

11. The method of claim 10, wherein the predicting of the time-varying traffic data features of each traffic data category comprises:
 determining history time-varying traffic data features and history time-invariant traffic data features of each traffic data category according to the history traffic data corresponding to each traffic data category; and
 predicting the time-varying traffic data features of each traffic data category in the sharing period according to the history time-varying traffic data features of each traffic data category,
 wherein, determining the new traffic data amount of each traffic data category in the sharing period according to the time-varying traffic data features of each traffic data category in the sharing period, comprises determining the new traffic data amount of each traffic data category in the sharing period according to the history time-invariant traffic data features of each traffic data category and the time-varying traffic data features of each traffic data category in the sharing period.

12. The method of claim 1, further comprising:
 receiving, from a second base station using the second RAT system, resource information and history traffic data of the second RAT system among the history traffic data of the at least two RAT system,
 wherein the electronic device comprises a first base station using the first RAT system.

13. The method of claim 1, wherein the predicted traffic data amount is classified a user category, a traffic type category, and a RAT system category.

14. The method of claim 1, wherein the history traffic data comprises at least one of:
a user identifier corresponding to traffic data;
a quality of service class (QoS) identifier corresponding to traffic data;
a logical channel group identifier corresponding to traffic data;
a traffic data amount to be transmitted in at least one history sharing period; and
an actually transmitted traffic data amount of at least one history sharing period.

15. The method of claim 1, wherein the at least two RAT systems comprise a fourth-generation mobile communication system (4G) and a fifth-generation mobile communication system (5G).

16. An electronic device, comprising:
a processor; and
a memory, comprising instructions, which when executed by the processor, cause the electronic device to:
obtain at least one time-variant feature and at least one time-invariant feature from history traffic data of at least two radio access technology (RAT) systems;
obtain a predicted traffic data amount of the at least two RAT systems in a sharing period based on a prediction result of the at least one time-variant feature using an artificial intelligence (AI) model and the at least one time-invariant feature; and
perform a resource allocation for the at least two RAT systems in the sharing period based on the predicted traffic data amount of the at least two RAT systems,
wherein the predicted traffic data amount comprises a first predicted data amount of a first RAT system of the at least two RAT systems in the sharing period and a second predicted data amount of a second RAT system of the at least two RAT systems in the sharing period, and
wherein the predicted traffic data amount of the at least two RAT systems is obtained based on a principal component analysis (PCA) algorithm.

17. The electronic device of claim 16, wherein the processor is configured to:
determine at least one candidate transmission data amount in the sharing period according to the predicted traffic data amount of the at least two RAT systems;
determine a target candidate transmission data amount according to the at least one candidate transmission data amount; and
allocate spectrum resources according to the target candidate transmission data amount.

18. The electronic device of claim 17, wherein the processor is configured to:
determine a legacy data amount corresponding to each candidate transmission data amount combination in the sharing period, wherein each candidate transmission data amount combination includes one candidate transmission data amount corresponding to each traffic data category; and
determine, according to the legacy data amount corresponding to each candidate transmission data amount combination, the target candidate transmission data amount.

19. A non-transitory computer-readable medium comprising instructions, which when executed by a processor, cause an electronic device to:
obtain at least one time-variant feature and at least one time-invariant feature from history traffic data of at least two radio access technology (RAT) systems;
obtain a predicted traffic data amount of the at least two RAT systems in a sharing period based on a prediction result of the at least one time-variant feature using an artificial intelligence (AI) model and the at least one time-invariant feature; and
perform a resource allocation for the at least two RAT systems in the sharing period based on the predicted traffic data amount of the at least two RAT systems,
wherein the predicted traffic data amount comprises first predicted data amount of a first RAT system of the at least two RAT systems in the sharing period and a second predicted data amount of a second RAT system of the at least two RAT systems in the sharing period, and
wherein the predicted traffic data amount of the at least two RAT systems is obtained based on a principal component analysis (PCA) algorithm.

* * * * *